(12) United States Patent
Fiaschi et al.

(10) Patent No.: US 11,201,816 B2
(45) Date of Patent: Dec. 14, 2021

(54) OPTIMAL ROUTING IN A COMMUNICATIONS NETWORK

(71) Applicant: Telefonaktiebolaget LM Ericsson (publ), Stockholm (SE)

(72) Inventors: Giovanni Fiaschi, Sollentuna (SE); Shahryar Khan, Rönninge (SE); Junhui Liu, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 43 days.

(21) Appl. No.: 16/614,532

(22) PCT Filed: Jun. 8, 2017

(86) PCT No.: PCT/EP2017/064033
§ 371 (c)(1),
(2) Date: Nov. 18, 2019

(87) PCT Pub. No.: WO2018/224157
PCT Pub. Date: Dec. 13, 2018

(65) Prior Publication Data
US 2020/0186459 A1    Jun. 11, 2020

(51) Int. Cl.
*H04L 12/721* (2013.01)

(52) U.S. Cl.
CPC .................................. *H04L 45/123* (2013.01)

(58) Field of Classification Search
CPC .................................................... H04L 45/123
See application file for complete search history.

(56) References Cited

U.S. PATENT DOCUMENTS

| 5,430,729 | A | * | 7/1995 | Rahnema | ............. | H04B 7/1856 |
| | | | | | | 370/409 |
| 5,596,722 | A | * | 1/1997 | Rahnema | ............. | H04B 7/1858 |
| | | | | | | 370/400 |
| 5,687,167 | A | * | 11/1997 | Bertin | ................. | H04L 12/5602 |
| | | | | | | 370/254 |

(Continued)

OTHER PUBLICATIONS

Subhash Suri, Marcel Waldvogel, Daniel Bauer, Priyank Ramesh Warkhede, Profile-based routing and traffic engineering, Computer Communications, vol. 26, Issue 4, 2003, pp. 351-365, ISSN 0140-3664. (Year: 2003).*

(Continued)

*Primary Examiner* — Ayaz R Sheikh
*Assistant Examiner* — Tarell A Hampton
(74) *Attorney, Agent, or Firm* — Coats & Bennett, PLLC

(57) ABSTRACT

A method of determining an optimal route for communication between nodes in a communications network. The method comprises assigning a plurality of link potential values ($P_{ab}$) to a respective plurality of direct links ($l_{ab}$) between respective first and second nodes a and b in the network, wherein a link potential value ($P_{ab}$) represents a likelihood that the corresponding direct link will be used for future communication requests. The method comprises determining an optimal route between nodes based on the plurality of link potential values ($P_{ab}$).

16 Claims, 24 Drawing Sheets

(56) References Cited

U.S. PATENT DOCUMENTS

| | | | | |
|---|---|---|---|---|
| 5,933,425 | A * | 8/1999 | Iwata | H04L 45/02 370/351 |
| 7,308,198 | B1 * | 12/2007 | Chudak | H04L 45/02 398/58 |
| 7,756,959 | B1 * | 7/2010 | Beshai | H04L 45/22 709/223 |
| 10,148,578 | B2 * | 12/2018 | Morris | H04L 47/127 |
| 2002/0049855 | A1 * | 4/2002 | Porotsky | H04L 45/00 709/238 |
| 2003/0058797 | A1 * | 3/2003 | Izmailov | H04L 45/00 370/238 |
| 2003/0063568 | A1 * | 4/2003 | Teig | G06F 30/394 370/252 |
| 2005/0265255 | A1 * | 12/2005 | Kodialam | H04L 45/24 370/252 |
| 2006/0200579 | A1 * | 9/2006 | Vasseur | H04L 45/12 709/238 |
| 2009/0003217 | A1 * | 1/2009 | Ferra | H04L 41/0853 370/238 |
| 2009/0092124 | A1 * | 4/2009 | Singhal | H04L 67/327 370/351 |
| 2009/0175171 | A1 | 7/2009 | Nikolova et al. | |
| 2012/0195229 | A1 * | 8/2012 | Chen | H04L 45/12 370/254 |
| 2013/0024561 | A1 * | 1/2013 | Imai | H04W 40/08 709/224 |
| 2013/0266316 | A1 | 10/2013 | Xia et al. | |
| 2016/0182329 | A1 * | 6/2016 | Armolavicius | H04L 41/0893 370/230 |
| 2016/0344615 | A1 | 11/2016 | Hao et al. | |

OTHER PUBLICATIONS

M. H. B. Rochi, A. Dana and M. Ziyaee, "A new source routing mechanism in mobile ad-hoc network," 13th International Conference on Advanced Communication Technology (ICACT2011), Gangwon, Korea (South), 2011, pp. 948-952. (Year: 2011).*

M. Wang, S. A. Davidson and Y. S. Chuang, "A Design Method to Select Optimal Routes and Balance Load in Wireless Communication Networks," MILCOM 2013—2013 IEEE Military Communications Conference, San Diego, CA, USA, 2013, pp. 916-921, doi: 10.1109/MILCOM.2013.159. (Year: 2013).*

Yuekang Yang and Chung-Horng Lung, "The role of traffic forecasting in QoS routing—a case study of time-dependent routing," IEEE International Conference on Communications, 2005. ICC 2005. 2005, Seoul, Korea (South), 2005, pp. 224-228 Vol. 1, doi: (Year: 2005).*

* cited by examiner

OPTIMAL ROUTING IN A COMMUNICATIONS NETWORK

TECHNICAL FIELD

The embodiments described herein relate to determining an optimal route for communication between nodes in a communications network, in particular, by determining link potential values relating to a likelihood that a particular link will be used in future communications.

BACKGROUND

Routing in telecommunications networks has been extensively studied. Optimization of the routing within networks may be performed by setting an objective to use, as much as possible, the least costly set of resources. For example, a resource may be considered to be costly for the purposes of optimal routing, if it is expected to be needed for many potential future services, in contrast to a resource having a low cost as it is likely to be used only very rarely.

The cost of a resource may therefore be defined as its capability of supporting future service requests. Such a definition would be based on probabilistic considerations, which in turn may vary depending on the current network knowledge.

Furthermore, a routing algorithm may include constraints, considering that, irrespective of the cost of a resource set, some routes are infeasible as they do not fulfill the service requirements. For example, routes which are too long may be unacceptable if the service has strict delay requirements.

SUMMARY

According to one aspect, there is provided a method of determining an optimal route for communication between nodes in a communications network. The method comprises assigning a plurality of link potential values, $P_{ab}$, to a respective plurality of direct links, $l_{ab}$, between respective first and second nodes a and b in the network, wherein a link potential value, $P_{ab}$, represents a likelihood that the corresponding direct link will be used for future communication requests. The method also comprises determining an optimal route between nodes based on the plurality of link potential values, $P_{ab}$.

In some embodiments the method comprises for a request, $d_{ij}$ to send traffic between a first node $n_i$ and a second node $n_j$; determining a set of feasible routes, $F(d_{ij})$, between the first node, $n_i$, and the second node $n_j$; and determining, based on the plurality of link potential values, $P_{ab}$, which of the set of feasible routes, $F(d_{ij})$, is an optimal route for the request, $d_{ij}$.

In some embodiments step of determining, based on the plurality of link potential values, $P_{ab}$, which of the set of feasible routes, $F(d_{ij})$, is an optimal route for the request, $d_{ij}$, comprises: calculating a cost of each feasible route, $R_k(d_{ij})$, based on the link potential values, $P_{ab}$, link usage values, $U_{ab}$, and link capacity values, $C_{ab}$ for each of the direct links, $l_{ab}$ in each respective feasible route; and selecting the feasible route with the lowest cost as the optimal route for the request, $d_{ij}$.

The link usage, $U_{ab}$ may include the usage for the direct link, $l_{ab}$ in the request, $d_{ij}$ and/or any pre-existing usage on the link, $l_{ab}$.

In some embodiments the plurality of link potential values are based on a plurality of node potential values, $P(n)$, for nodes in the network; wherein a node potential value, $P(n)$ for a node is representative of a traffic handling capacity of the node in the network.

The step of assigning the plurality of link potential values, $P_{ab}$, may comprise, for each direct link, $l_{ab}$: determining a first set of nodes, $N_{ab}$ comprising all possible start nodes for feasible routes using the direct link, $l_{ab}$; determining a second set of nodes, $N_{ba}$ all possible end nodes for feasible routes using the direct link $l_{ab}$. The step of assigning the plurality of link potential values, $P_{ab}$, may also comprise and for each particular node, $n_i$, in the first set of nodes, $N_{ab}$, calculating a first weighting, $W(n_i, l_{ab})$ as a sum of the node potential values of each node which is an end node of a feasible route, $R_k(d_{ij})$, starting at the particular node, $n_i$ of the first set of nodes, $N_{ab}$. For each particular node, $n_j$ in the second set of nodes, $N_{ba}$, the method may comprise calculating a second weighting, $W(n_j, l_{ab})$, as a sum of the node potential values of each node which is a start node of a feasible route, $R_k(d_{ij})$ ending at the particular node, $n_j$, of the second set of nodes, $N_{ba}$; and calculating the link potential, $P_{ab}$, for the direct link, $l_{ab}$ as:

$$P_{ab} = \sum_{n_i \in N_{ab}} W(n_i, l_{ab}) \cdot P(n_i) \cdot \sum_{n_j \in N_{ba}} W(n_j, l_{ab}) \cdot P(n_j).$$

The plurality of link potential values, $P_{ab}$, may be calculated based on a set, D, of forecast connectivity requests, $d_{ij}$.

The set, D of forecast connectivity requests, $d_{ij}$ may be determined from an estimate of the overlapping area between the areas serviced by two nodes and a population density of requesting wireless devices in the overlapping area.

In some embodiments the step of assigning the plurality of link potential values, $P_{ab}$, comprises: for each forecast connectivity request, $d_{ij}$, determining the set of all feasible routes, $F(d_{ij})$, of the connectivity request, $d_{ij}$; determining a subset, $F_{ab}(d_{ij})$, of feasible routes that use the direct link, $l_{ab}$; and calculating the link potential value of the direct link, $l_{ab}$, as:

$$P_{ab} = \sum_{d_{ij} \in D} \frac{|F_{ab}(d_{ij})|}{|F(d_{ij})|} \cdot U_{ij};$$

where $U_{ij}$ is a usage requirement of the forecast connectivity request, $d_{ij}$.

The link potential value, $P_{ab}$ for each direct link, $l_{ab}$, may be recalculated as each forecast connectivity request is allocated an optimal route for use.

A route may be a feasible route if the route comprises less than or equal to a predetermined number of direct links or if the total delay across the direct links of the route is less than a predetermined delay.

According to a further aspect there is provided a network node configured to determine an optimal route between nodes in a communications network. The network node comprises a processor and a memory, said memory containing instructions executable by said processor, wherein said processor is operative to: assign a plurality of link potential values, $P_{ab}$, to a respective plurality of direct links, $l_{ab}$, between respective first and second nodes a and b in the network, wherein a link potential value, $P_{ab}$, represents a likelihood that the corresponding direct link will be used for future communication requests; and determine an optimal route between nodes based on the plurality of link potential values, $P_{ab}$.

The processor may be operative to: for a request, $d_{ij}$ to send traffic between a first node $n_i$ and a second node $n_j$; determine a set of feasible routes, $F(d_{ij})$, between the first node, $n_i$, and the second node $n_j$; and determine, based on the plurality of link potential values, $P_{ab}$, which of the set of feasible routes, $F(d_{ij})$, is an optimal route for the request, $d_{ij}$.

The processor may be operative to determine, based on the plurality of link potential values, $P_{ab}$, which of the set of feasible routes, $F(d_{ij})$, is an optimal route for the request, $d_{ij}$, by: calculating a cost of each feasible route, $R_k(d_{ij})$ based on the link potential values, $P_{ab}$, link usage values, $U_{ab}$, and link capacity values, $C_{ab}$ for each of the direct links, $l_{ab}$ in each respective feasible route; and selecting the feasible route with the lowest cost as the optimal route for the request, $d_{ij}$.

The link usage, $U_{ab}$ may include the usage for the direct link, $l_{ab}$, in the request, $d_{ij}$, and/or any pre-existing usage on the link, $l_{ab}$ The plurality of link potential values may be based on a plurality of node potential values, $P(n)$, for nodes in the network; wherein a node potential value, $P(n)$ for a node is representative of a traffic handling capacity of the node in the network.

The processor may be further operative to assign the plurality of link potential values, $P_{ab}$, by, for each direct link, $l_{ab}$: determining a first set of nodes, $N_{ab}$, comprising all possible start nodes for feasible routes using the direct link, $l_{ab}$; determining a second set of nodes, $N_{ba}$, all possible end nodes for feasible routes using the direct link $l_{ab}$; and for each particular node, $n_i$ in the first set of nodes, $N_{ab}$, calculating a first weighting, $W(n_i, l_{ab})$ as a sum of the node potential values of each node which is an end node of a feasible route, $R_k(d_{ij})$ starting at the particular node, $n_i$ of the first set of nodes, $N_{ab}$; for each particular node, $n_j$ in the second set of nodes, $N_{ba}$, calculating a second weighting, $W(n_j, l_{ab})$, as a sum of the node potential values of each node which is a start node of a feasible route, $R_k(d_{ij})$ ending at the particular node, $n_j$, of the second set of nodes, $N_{ba}$; and calculating the link potential, $P_{ab}$, for the direct link, $l_{ab}$ as $$P_{ab} = \sum_{n_i \in N_{ab}} W(n_i, l_{ab}) \cdot P(n_i) \cdot \sum_{n_j \in N_{ba}} W(n_j, l_{ab}) \cdot P(n_j).$$

The plurality of link potential values, $P_{ab}$, may be based on a set, D of forecast connectivity requests, $d_{ij}$.

The set, D of forecast connectivity requests, $d_{ij}$ may be determined from an estimate of the overlapping service area between two nodes and a population density of requesting devices in the overlapping service area.

The processor may be further operative to assign the plurality of link potential values, $P_{ab}$, by: for each forecast connectivity request, $d_{ij}$ determining the set of all feasible routes, $F(d_{ij})$, of the connectivity request, $d_{ij}$; determining a subset, $F_{ab}(d_{ij})$, of feasible routes that use the direct link, $l_{ab}$; and calculating the link potential value of the direct link, $l_{ab}$ as:

$$P_{ab} = \sum_{d_{ij} \in D} \frac{|F_{ab}(d_{ij})|}{|F(d_{ij})|} \cdot U(d_{ij});$$

where $U(d_{ij})$ is a usage requirement of the forecast connectivity request, $d_{ij}$.

The link potential value, $P_{ab}$ for each direct link, $l_{ab}$ may be recalculated as each forecast connectivity request is allocated an optimal route for use.

A route may be a feasible route if the route comprises less than or equal to a predetermined number of direct links or if the total delay across the direct links of the route is less than a predetermined delay.

The network node may be a Path Calculation Entity (PCE).

The network node may be further configured to allocate the request to the optimal route.

According to a further aspect there is provided a network node for determining an optimal route between nodes in a communications network. The network node comprises an assigning module for assigning a plurality of link potential values, $P_{ab}$, to a respective plurality of direct links, $l_{ab}$, between respective first and second nodes a and b in the network, wherein a link potential value, $P_{ab}$, represents a likelihood that the corresponding direct link will be used for future communication requests; and a determining module for determining an optimal route between nodes based on the plurality of link potential values, $P_{ab}$.

According to another aspect there is provided a computer program. The computer program comprises instructions which, when executed on at least one processor, cause the at least one processor to carry out a method as described above.

According to another aspect there is provided a computer program product comprising a computer program as described above.

DESCRIPTION

The following sets forth specific details, such as particular embodiments for purposes of explanation and not limitation. But it will be appreciated by one skilled in the art that other embodiments may be employed apart from these specific details. In some instances, detailed descriptions of well-known methods, nodes, interfaces, circuits, and devices are omitted so as not obscure the description with unnecessary detail.

Figure 1:
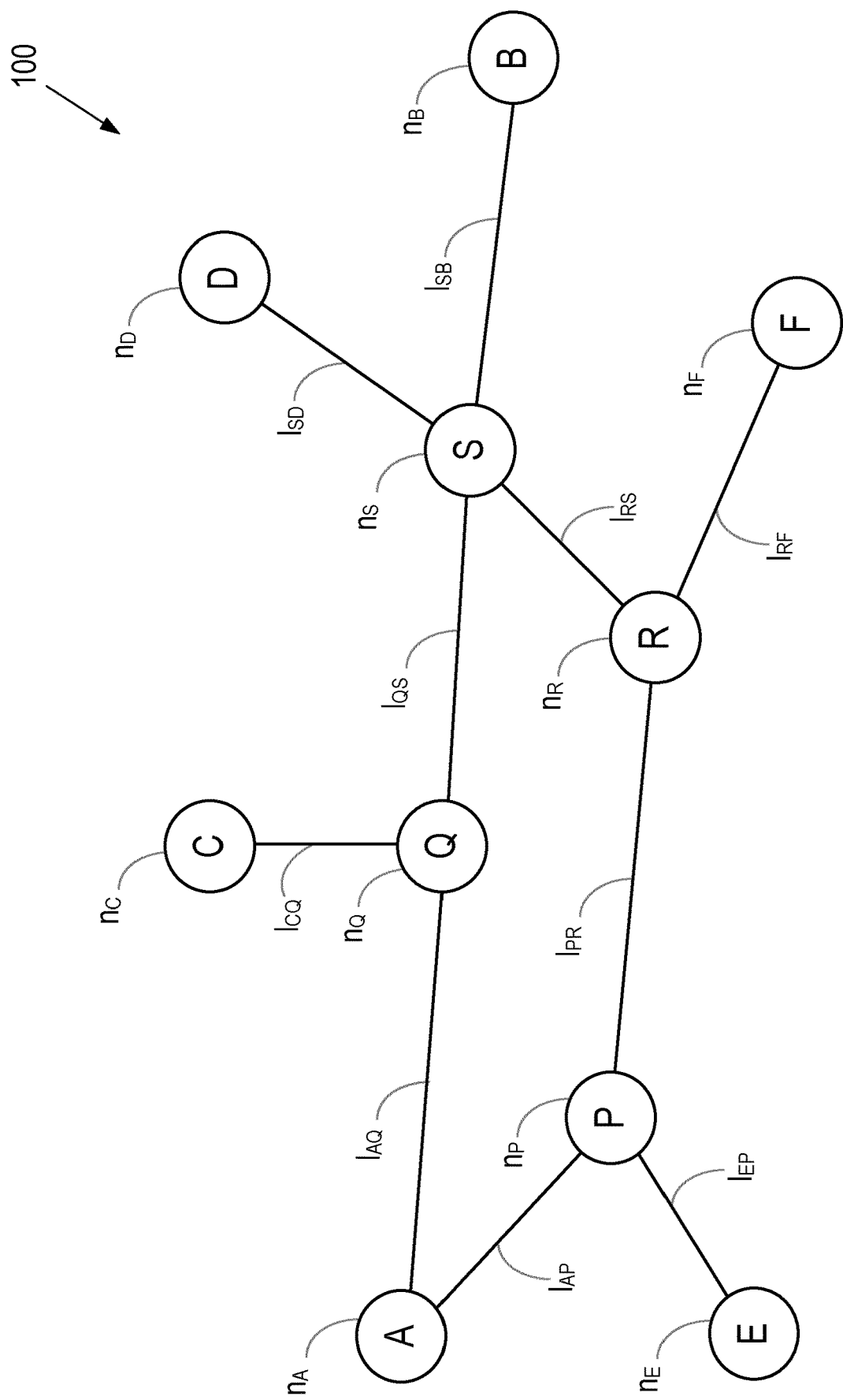
FIG. 1 illustrates a network 100.

FIG. 1 illustrates a network 100. This network 100 will be utilized as an example network to illustrate a number of methods and apparatus for providing optimal routing through communications networks. The optimal routing may be calculated by a network entity, e.g. a Path Calculation Entity (PCE), which may be part of or connected to the network 100.

The network 100 is composed of ten nodes, $n_i$. In this example, the network comprises the nodes $n_A, n_B, n_C, n_D, n_E, n_F, n_P, n_Q, n_R,$ and $n_S$. It will be appreciated that a network for which the embodiments described are implemented may comprise any number of nodes. These nodes may be any type of network node, for example, base stations, control nodes or mobile devices.

The nodes are connected by direct links $l_{ij}$, where the direct link $l_{ij}$ connects the nodes $n_i$ and $n_j$. The network 100, as an example comprises ten links $l_{AP}, l_{EP}, l_{AQ}, l_{PR}, l_{CQ}, l_{QS}, l_{SD}, l_{RS}, l_{RF}$ and $l_{SB}$. It will be appreciated that the nodes and connecting direct links may be arranged in any way.

Each link $l_{ij}$ has a corresponding capacity value $C_{ij}$ which represents the maximum amount of traffic that the link is capable of supporting at any one time. For example, a link capacity may be expressed in terms of bandwidth and may be for example, 1000 Mb/s. For ease of calculation this particular capacity value of 1000 Mb/s will be used in the below examples as the capacity for all discussed direct links. However, it will be appreciated that other capacity values may be used, and that the different direct links in the network 100 may have different capacity values.

Each link $l_{ij}$ also has a corresponding penalty value, penalty($l_{ij}$). This penalty value may take into account a number of factors such as the latency across the link $l_{ij}$. In the described examples below, the penalty value is assumed to be equal for all the links, so an example value of 1 for each link is chosen for these examples.

A set of communication requests, $d_{ij}$, between the nodes $n_i$ and $n_j$ may specify a required usage value, $U_{ij}$. The communication requests may be received, for example, by a PCE for the network. For example, the required usage value, $U_{ij}$ may be expressed in bandwidth and may be, for example, 300 Mb/s. In other words, the specific communication request, $d_{ij}$, may require that 300 Mb/s of data is transmitted across each link, $l_{ab}$ of whichever route between the nodes $n_i$ and $n_j$ is allocated to the communication request, $d_{ij}$. In other examples, the required usage value may be expressed in other units. In particular, the units used for the required usage value may be different to those of the capacity of the direct link.

A communication request, $d_{ij}$ may also specify a feasibility requirement as to whether or not a particular route between nodes $n_i$ and $n_j$ is considered feasible. In some examples, the route may be considered as feasible if a parameter characterizing the route is within a specified range. For example, the route may be required to contain no more than a specified maximum number of links, or the total of the penalty values of each link in the route may be required to be below a maximum threshold value. In other words, a feasible route may be required to have a latency which is less than a threshold value.

The feasibility requirements may be expressed as a value, max_penalty($d_{ij}$), given in the same units of measurements of the link penalty values, e.g., latency. In the below examples, the feasibility requirement is assumed to be a particular value, for example, 4 for all the requests, whether the requests are actual, theoretical or forecast.

A route for $d_{ij}$ is a set $R_k(d_{ij})$ of adjacent links starting from node $n_i$ and ending in node $n_j$.

Each link, $l_{ab}$ within the route, $R_k(d_{ij})$ has a usage value $U_{ab}$ which may vary over time depending on a sum of the usage requirements of the requests routed through it.

The penalty for a particular route, penalty($R_k(d_{ij})$) may be expressed as a sum of the penalties of each of the links in the route, in other words, $$\text{penalty}(R_k(d_{ij})) = \sum_{l_{ab} \in R_k(d_{ij})} \text{penalty}(l_{ab}).$$

A feasible route is a route satisfying the request feasibility requirements, that is to say a route may be considered feasible if it satisfies the following requirement:

is_feasible($R_k(d_{ij})$)≡penalty($R_k(d_{ij})$)≤max_penalty($d_{ij}$).

Allocating a request $d_{ij}$ across a link $l_{ab}$ has a cost Cost($d_{ij}, l_{ab}$). The total cost of a route, $R_k(d_{ij})$ may then be the sum of the costs for each link within the route, i.e:

$$\text{Cost}(R_k(d_{ij})) \equiv \sum_{l_{ab} \in R_k(d_{ij})} \text{Cost}(d_{ij}, l_{ab})$$

The cost for each link may be calculated in many different ways, as will be described below.

For the sake of simplicity, the notation $d_{ij}$ is used to denote communication requests between nodes $n_i$ and $n_j$, if multiple independent requests exist between the same end nodes the notation $d_{ij}'$ can be used to indicate a second independent request between the same end nodes. Three kinds of connectivity request are considered: theoretical requests, with no real knowledge of the required usage, so they assume $U_{ij}=0$ and max_penalty($d_{ij}$)=MP for all theoretical communication requests $d_{ij}$, where MP is a network parameter; actual requests, with fully reliable requirement specifications; or forecast requests, with full requirement specifications, but some degree of uncertainty. The uncertainty value of the forecast requests may be considered, but in the following all the forecast requests are assumed to have the same degree of uncertainty.

One example of how the cost of a link may be calculated is to define the cost of the link as the portion of the total capacity of the link that is requested to provide service for a request. In a network of nodes and edges, where each edge has a fixed capacity (bandwidth) and a connectivity service has in turn a given usage requirement, the cost on each link is given by the service usage requirement. In other words the cost for a link $l_{ab}$ in a request $d_{ij}$ can be calculated as:

$$\text{Cost}(d_{ij}, l_{ab}) = \frac{U_{ij}}{C_{ab}}.$$

This method of cost calculation may minimize the total amount of used resources. While a network with a higher overall capacity may be considered to have a higher capability to allocate services, if the residual capacity becomes unevenly distributed, bottlenecks may occur that represent roadblocks which may severely limit the network potential.

Figure 2:
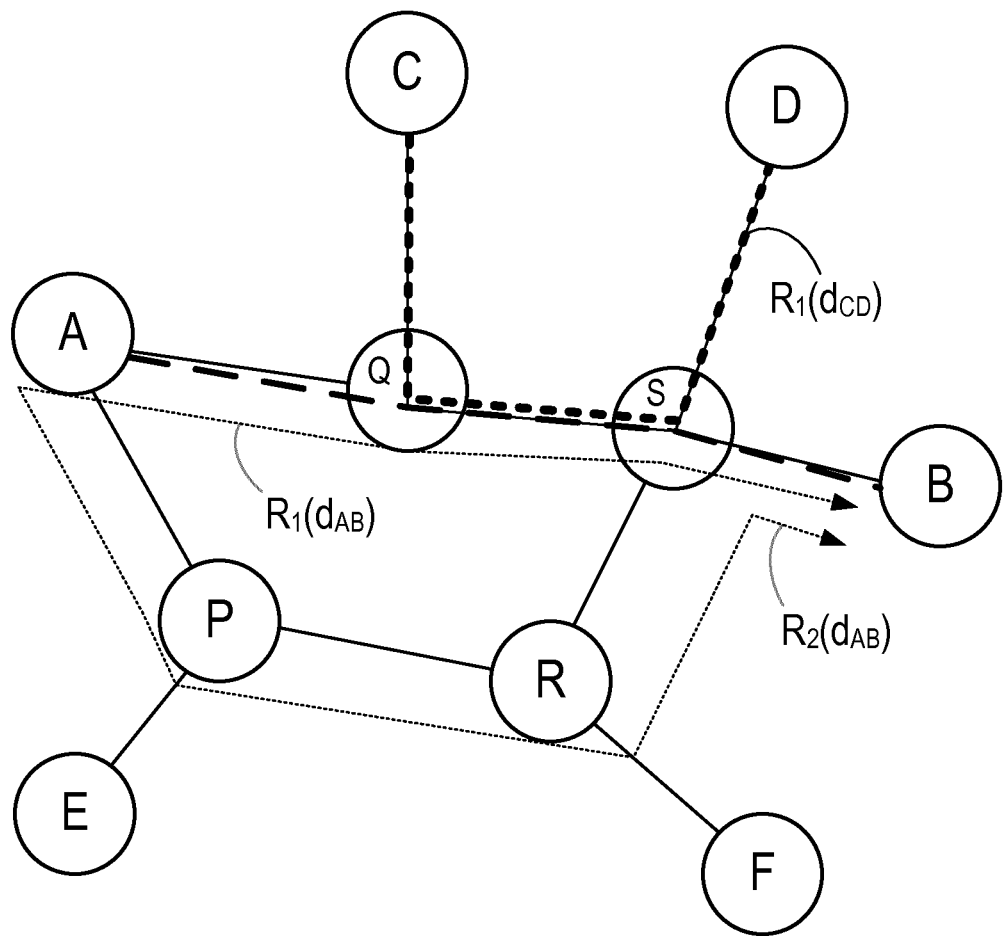
FIGS. 2 and 3 illustrate the allocation of two actual requests in the network 100.
Figure 3:
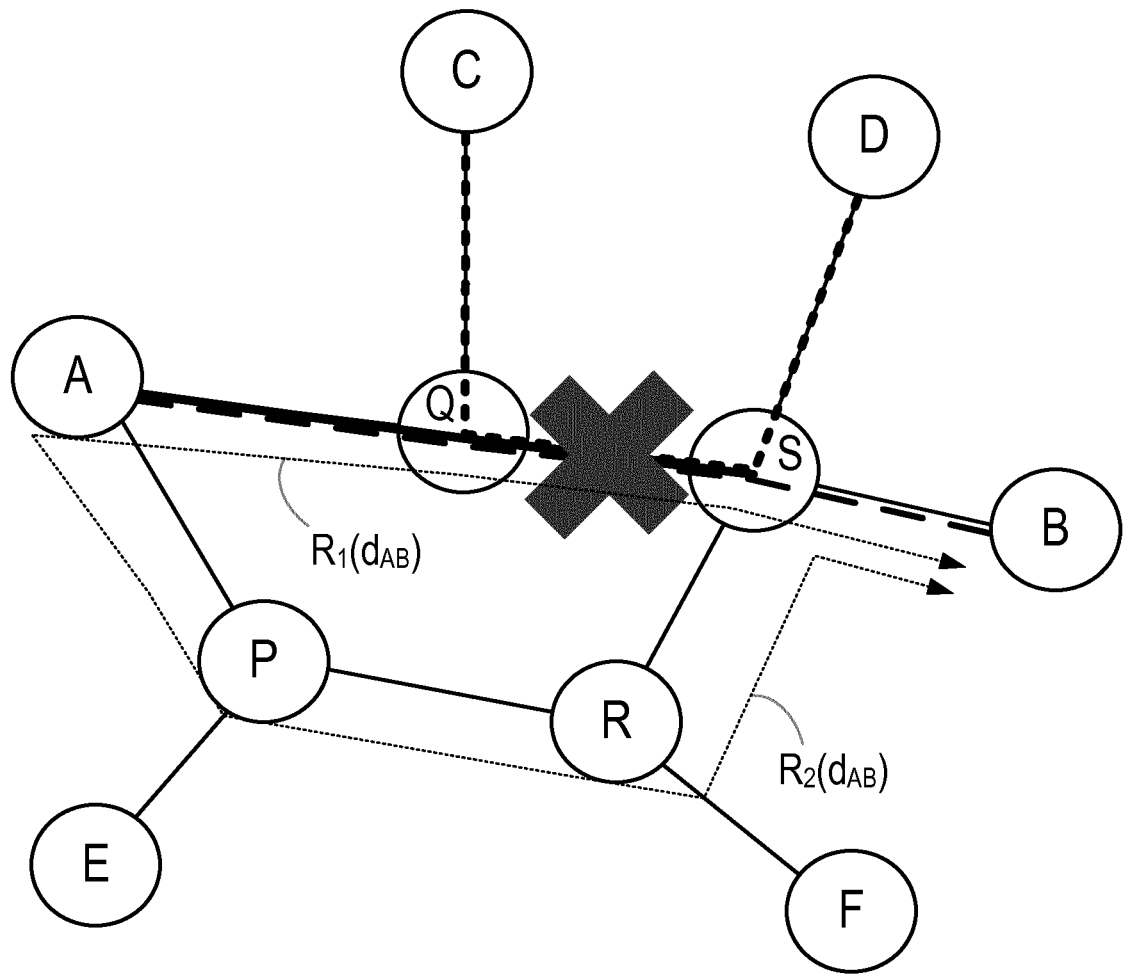

FIGS. 2 and 3 illustrate two actual requests $d_{AB}$, which is a request to communicate traffic between the nodes $n_A$ and $n_B$, and $d_{CD}$, which is a request to communicate traffic between the nodes $n_C$ and $n_D$. For clarity, the labelling for the nodes and links have been left off these figures, but it will be appreciated that the labelling of FIG. 1 applies equally to these figures. In this example, the request $d_{AB}$ has a usage value of $U_{AB}=300$ Mb/s, and the request $d_{CD}$ has a usage value of $U_{CD}=200$ Mb/s.

In the example of FIG. 2, the network is empty before the two requests are allocated. The cost of request $d_{AB}$ is calculated for the two feasible routes. The first route, $R_1(d_{AB})$ is through the nodes $n_A$, $n_Q$, $n_S$ and $n_B$, and the second route, $R_2(d_{AB})$ is through the nodes $n_A$, $n_P$, $n_R$, $n_S$ and $n_B$.

The cost of $R_1(d_{AB})$ may be calculated as:

$$\text{Cost}(R_1(d_{AB})) = \frac{U_{AB}}{C_{AQ}} + \frac{U_{AB}}{C_{QS}} + \frac{U_{AB}}{C_{SB}} = 3\frac{300}{1000}0.9.$$

The cost of $R_2(d_{AB})$ may be calculated as:

$$\text{Cost}(R_2(d_{AB})) = \frac{U_{AB}}{C_{AP}} + \frac{U_{AB}}{C_{PR}} + \frac{U_{AB}}{C_{RS}} + \frac{U_{AB}}{C_{SB}} = 4\frac{300}{1000} = 1.2.$$

Therefore, $R_1(d_{AB})$ is chosen as the optimal route for the request $d_{AB}$ as the calculated cost value for the route $R_1(d_{AB})$, i.e. 0.9, is lower.

The request $d_{CD}$ only has one feasible route, $R_1(d_{CD})$ through the nodes $n_C$, $n_Q$, $n_S$ and $n_D$. However, as there is only one common link between the route $R_1(d_{AB})$ and $R_1(d_{CD})$, i.e. the link $l_{QS}$, which has a capacity of 1000 Mb/s with only 300 Mb/s of this capacity is allocated to the request $d_{AB}$, there is still capacity left on the link $l_{QS}$ to allocate to the request $d_{CD}$.

In the example of FIG. 3 there is assumed to be pre-existing traffic, $d_{AS}$ having a bandwidth of 700 Mb/s on the links $l_{AQ}$ and $l_{QS}$, which is present in the network before the requests $d_{AB}$ and $d_{CD}$ are allocated.

However, as this pre-existing traffic, $d_{AS}$ is not considered in the cost calculation for the optimal route for the request $d_{AB}$, the same result is found as in FIG. 2, and the request $d_{AB}$, is allocated to the route $R_1(d_{AB})$. However, as there is pre-existing traffic on the link $l_{QS}$, there is, in this scenario no capacity left on $l_{QS}$ to allocate to the request $d_{CD}$; and the communication request $d_{CD}$ fails.

Figure 4:
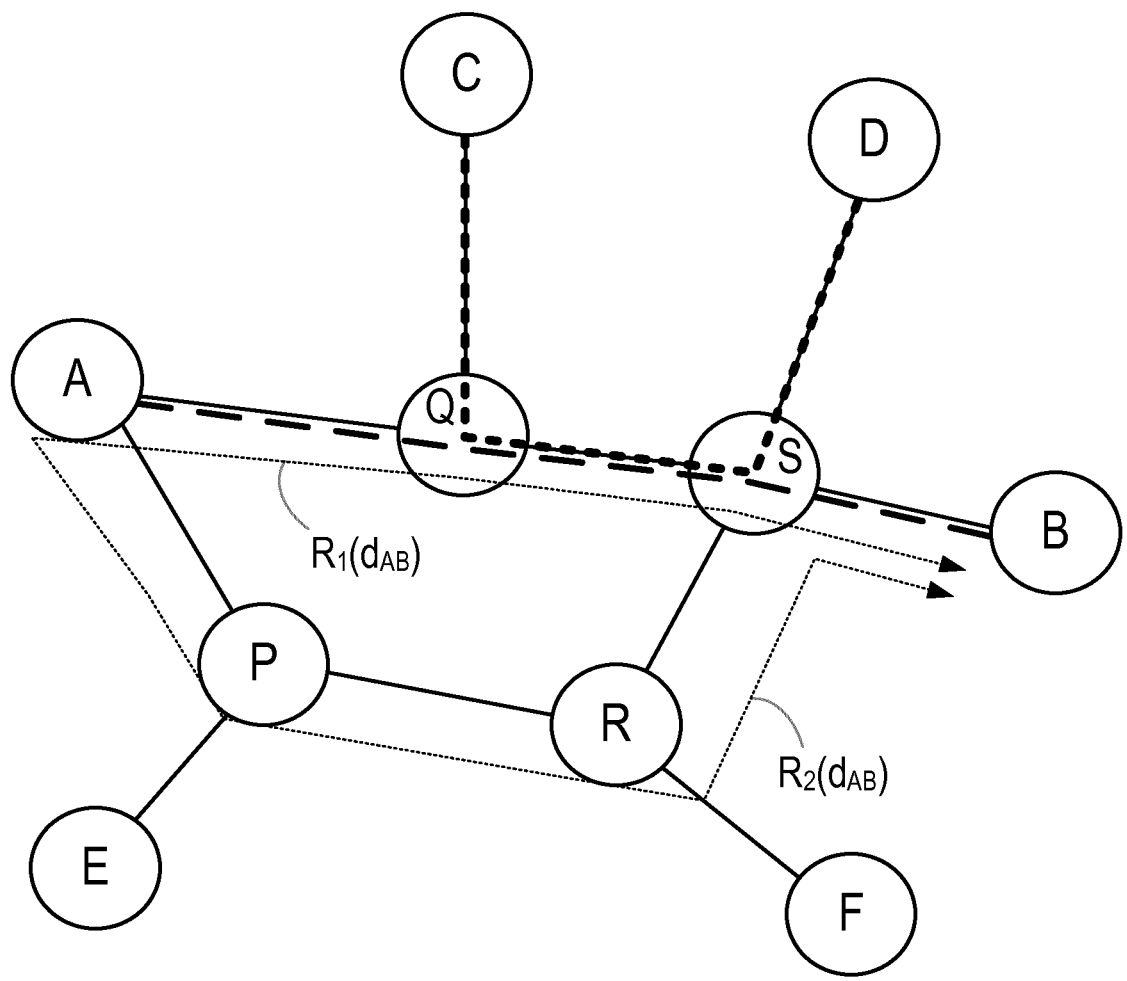
FIGS. 4, 5 and 6 illustrate the allocation of two actual requests in the network 100.
Figure 5:
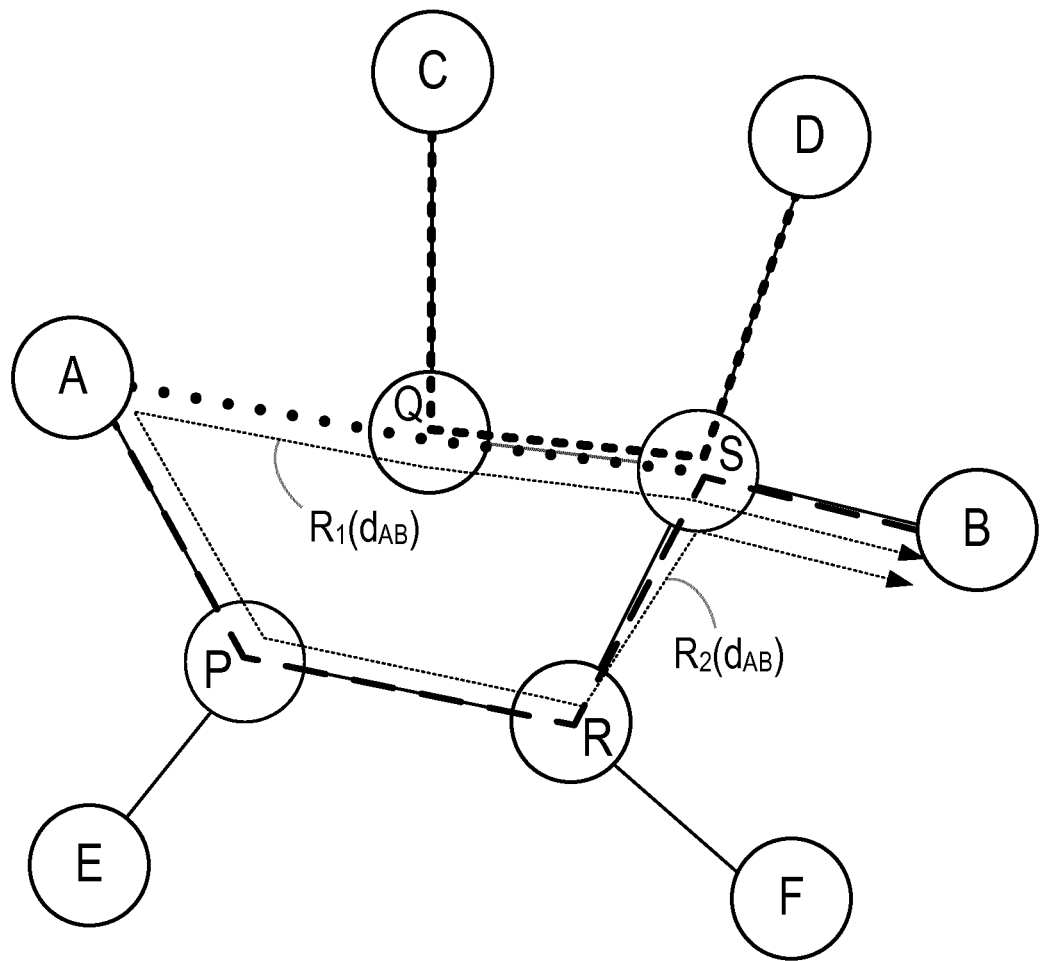
Figure 6:
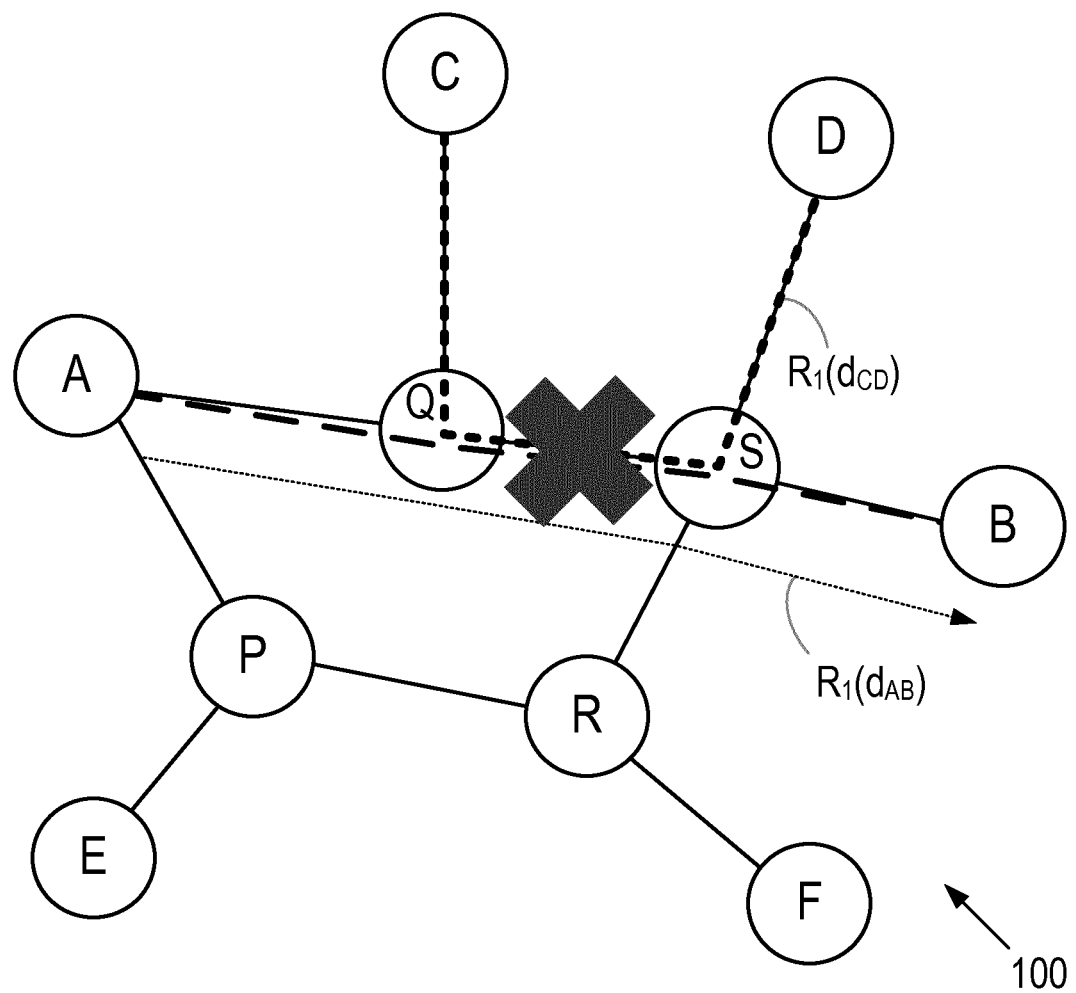

FIGS. 4, 5 and 6 illustrate the allocation of two actual requests, $d_{AB}$ which is a request to communicate traffic between the nodes $n_A$ and $n_B$, and $d_{CD}$ which is a request to communicate traffic between the nodes $n_C$ and $n_D$. Again, for clarity the labelling for the nodes and links have been left off these figures, but it will be appreciated that the labelling of FIG. 1 applies equally to these figures.

In this embodiment, the cost is calculated dynamically depending on any pre-existing traffic. By making the cost dynamically dependent on the link usage (i.e. the current link load), it is possible to divert the traffic on less used routes and fill the network more evenly.

The cost of a link $l_{ab}$ in a request $d_{ij}$ can be calculated as:

$$\text{Cost}(d_{ij}, l_{ab}) = \frac{U_{ij} + U_{ab}}{C_{ab}},$$

where $U_{ab}$ is the current usage value of the link $l_{ab}$. The value of $U_{ab}$ may then be updated after any requested is routed through it.

For the empty network, as shown in the example of FIG. 4, the result is the same as in FIG. 2 as there is no pre-existing traffic to include in the cost calculations.

In the example shown in FIG. 5, there is pre-existing traffic, $d_{AS}$ having a bandwidth of 700 Mb/s on the links $l_{AQ}$ and $l_{QS}$.

The cost of the request $d_{AB}$ for the two feasible routes, $R_1(d_{AB})$ and $R_2(d_{AB})$ may therefore be calculated as follows:

$$\text{Cost}(R_1(d_{AB})) = \frac{U_{AQ} + U_{AB}}{C_{AQ}} + \frac{U_{QS} + U_{AB}}{C_{QS}} + \frac{U_{SB} + U_{AB}}{C_{SB}} =$$
$$\frac{300 + 700}{1000} + \frac{300 + 700}{1000} + \frac{300}{1000} = 2.3$$

The cost of $R_2(d_{AB})$ may be calculated as:

$$\text{Cost}(R_2(d_{AB})) =$$
$$\frac{U_{AP} + U_{AB}}{C_{AP}} + \frac{U_{PR} + U_{AB}}{C_{PR}} + \frac{U_{RS} + U_{AB}}{C_{RS}} + \frac{U_{SB} + U_{AB}}{C_{SB}} = 4\frac{300}{1000} = 1.2.$$

Therefore, in this embodiment the route $R_2(d_{AB})$ is chosen to allocate to the request $d_{AB}$, thereby leaving capacity on the link $l_{QS}$ for the request $d_{CD}$.

However, for very high usage requirements, for example if the request $d_{CD}$ had a usage value $U_{CD}=800$ Mb/s, this embodiment will still cause a request failure, as shown in FIG. 6, as there would not be enough capacity free on the link $l_{QS}$. In this example, $d_{CD}$ has very high usage requirements and $d_{AB}$ must be routed in the empty network. As no knowledge on $d_{CD}$ is used, the shorter route, $R_1(d_{AB})$ is used, and the later communication request $d_{CD}$ cannot be routed.

Therefore this embodiment may overlook information about future service requests that could be available. For example, a link with little residual capacity (high usage or low capacity) could have also little potential, if it is accessible only by few termination nodes with little capacity.

With the recent advent of big data analytics, speculation on the use of knowledge about future requests has been made possible, by making considerations on large amounts of historical data exhibiting regularities. Exploitation of such regularities can give reasonable hints on future demand expectations. By routing the requests on resources with low probability of being used during the service lifespan, the network potential can be further increased.

Figure 7:
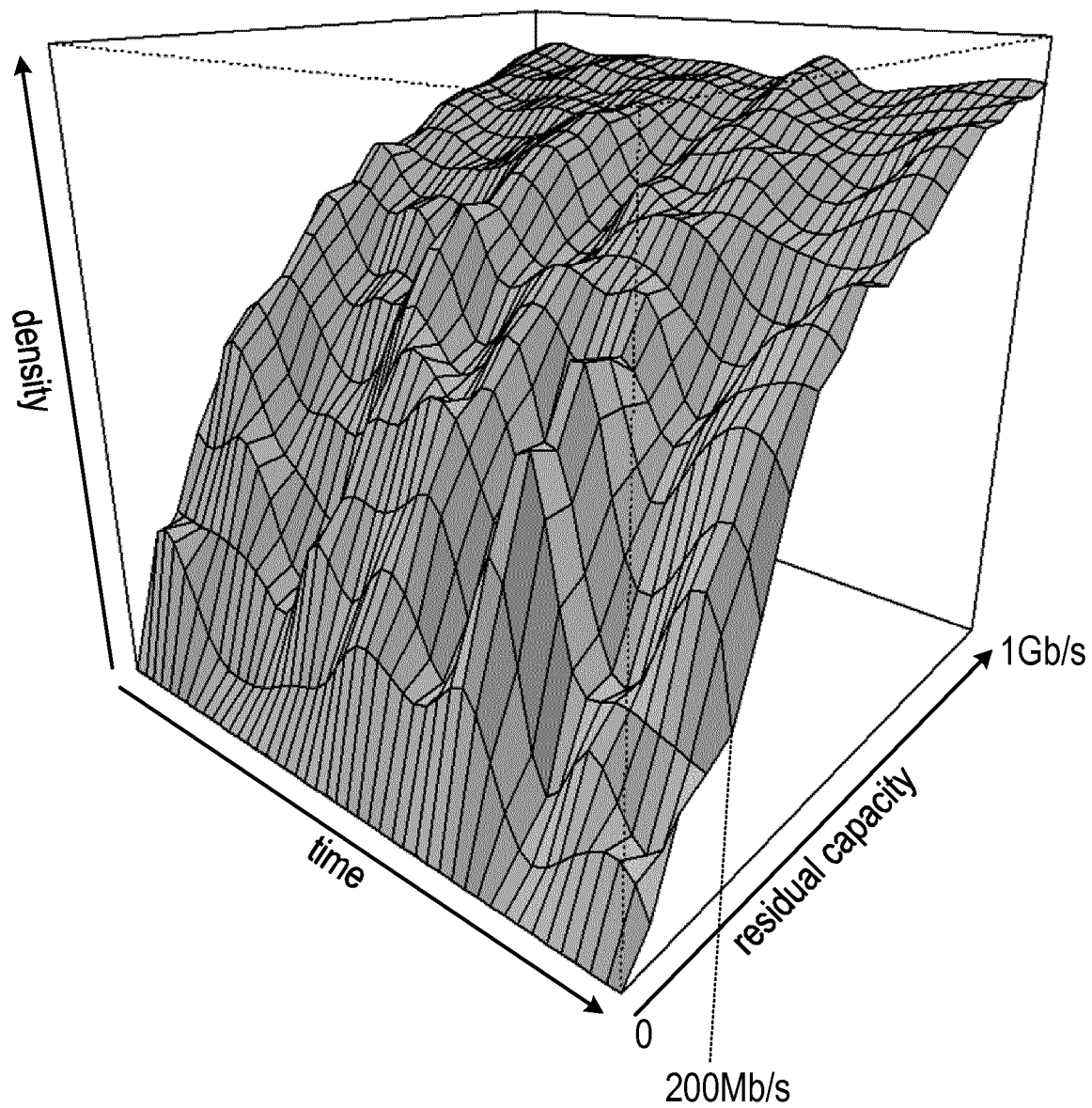
FIG. 7 illustrates a probability density that the residual capacity on a link will be less than a certain value.

FIG. 7 illustrates a probability density that the residual capacity on a link will be less than a certain value. For each link, a time dependent probability of occupation can be built. The higher the need, the higher the probability will be that such a high capacity will be partially occupied.

Figure 8:
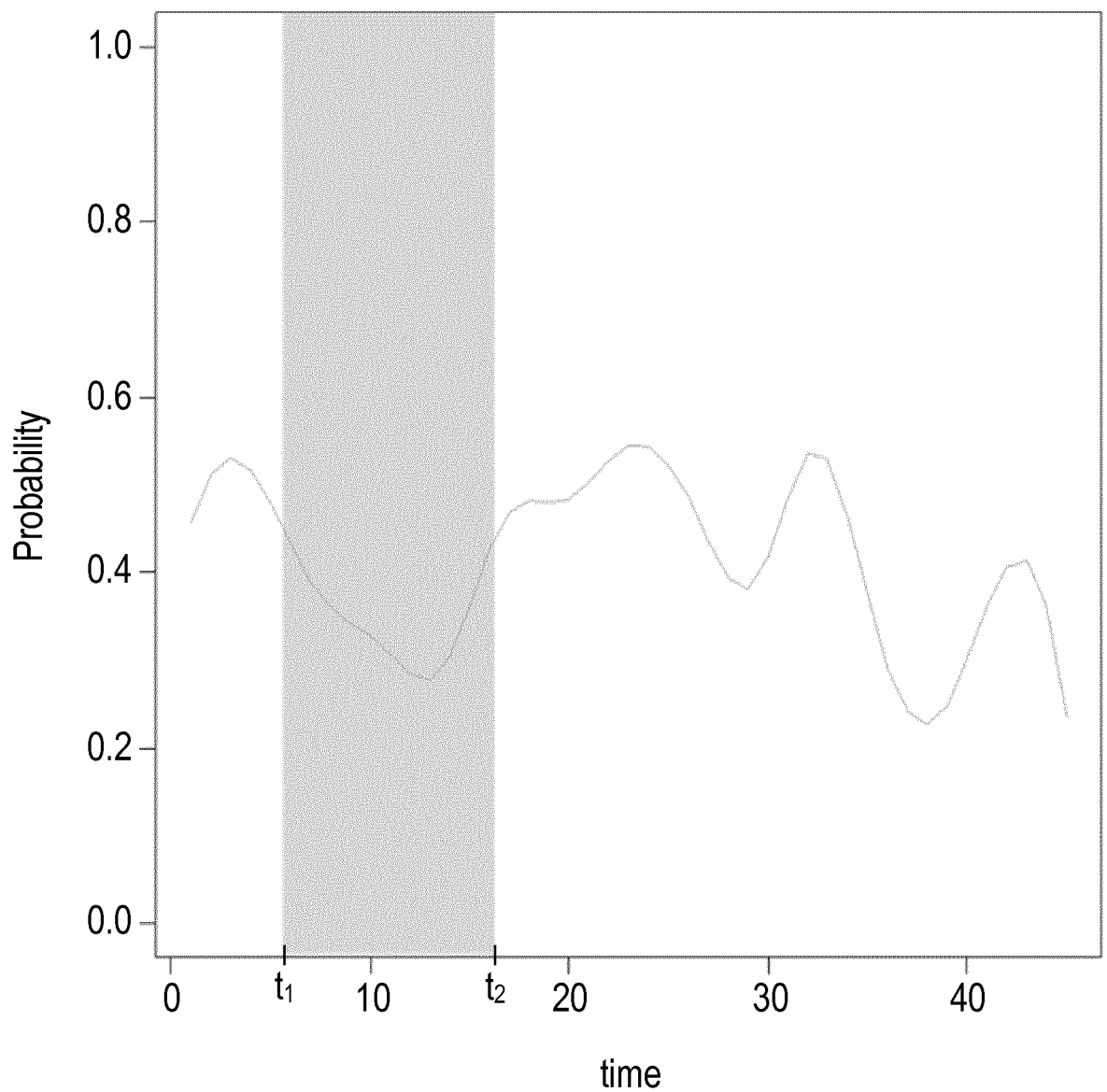
FIG. 8 illustrates the probability over time of having less than 200 Mb/s residual capacity on a link.

FIG. 8 illustrates the probability over time of having less than 200 Mb/s residual capacity on a link. In particular, FIG. 8 is a slice of the graph illustrated in FIG. 7, in particular a slice at $U_{AB}$=200 Mb/s. For a request $d_{AB}$ having $U_{AB}$=200 Mb/s to be allocated between $t_1$ and $t_2$, the cost of using a certain link could be equal to the probability of having less than 200 Mb/s left on that link in the time interval between $t_1$ and $t_2$. This is given by the maximum value of the curve in FIG. 8 in the shaded area.

To compute the cost on a route, the union of the probabilities over all the crossed links may be taken.

Figure 9:
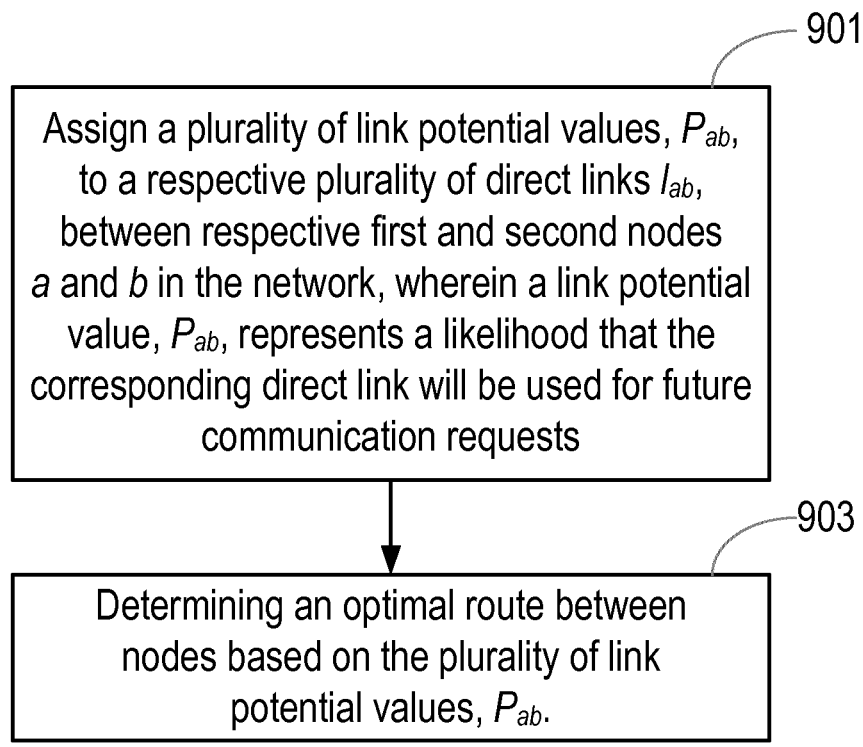
FIG. 9 illustrates an example of a method of determining an optimal route for communication between nodes in a communications network according to embodiments.

FIG. 9 illustrates a method of determining an optimal route for communication between nodes in a communications network. The method as described may be performed by any network node. For example, the method may be performed by a PCE for the network. For example, the method may be performed by a PCE or other software defined network (SDN) application of an SDN. The PCE may be part of a centralized SDN controller which then controls and/or updates the SDN nodes with the routing information in order to carry the traffic along the calculated optimal route. The method may be implemented for the fronthaul and/or backhaul portions of a centralized Radio Access Network, further details of which will be described later in the example of FIG. 24.

In step 901, the method comprises assigning a plurality of link potential values, $P_{ab}$, to a respective plurality of direct links, $l_{ab}$, between respective first and second nodes $n_a$ and $n_b$ in the network; wherein a link potential value, $P_{ab}$, represents a likelihood, or expected chance, that the corresponding direct link will be used for future communication requests. With regard to the likelihood that the corresponding direct link will be used for future communication requests, it is noted that the link potential value may be calculated, as will be described in further detail below, from one or both of two different types of static value: node potential values and forecast connectivity requests. The use of either of these static values in calculating the link potential value result in a value which relates to how the link will be used in the future, either because it is connected between nodes which have a large termination capacity, or because the forecast of requests which are likely to occur makes use of a link in a particular way.

A direct link may be a link between two nodes comprising no intermediate nodes. In some embodiments a direct link may be considered as a form of logical link such that, even if there are intermediate nodes between two nodes, such intermediate nodes are not taken into account and are ignored and the characteristics of the link, e.g. assumed to have complete capacity, penalty and usage information on each link are, meant as a whole.

In some embodiments, the link potential values are based on node potential values. Different definitions of the node potential values for each node can be given. For example, the node potential value may be based on the physical service termination capacity of the node. Thus, the node potential value may indicate an amount of traffic which can be handled by the node. Alternatively, the node potential value may be based on connectivity service expectations for example, average and/or peak bandwidth. The node potential value may be assumed to be a static characteristic of the node known in advance. If the node potential value changes during the network lifetime (e.g., by adding interfaces to the node), the link costs may be recomputed. Link potential values may then be calculated from the node potential values. In other words, links close to nodes having a high node potential values are expected to be useful for many future requests, and are therefore considered more costly, as they are more likely to be used for future communication requests, and have higher link potential values.

In other embodiments, the link potential values are based on forecast connectivity requests, e.g. a prediction of future requests. The forecast connectivity requests may be assumed to be a static characteristic of the network known in advance. For example, if the connectivity requests are for interfaces to be used for radio coordination between digital units subtending overlapping potential service areas, the expected future use of the interface may be proportional to the overlapping area multiplied by the subscriber density in that area. The forecast connectivity requests may therefore be determined from this expected future use of the interface. Again, forecast connectivity requests can be defined differently and may not be directly related to the actual resource usage, depending on the current knowledge limitations. Nevertheless, in some examples they may be at least statistically comparable. A higher number of forecast connectivity requests may assume a higher probability of resource demands and therefore a particular link may be considered more likely to be used for future communication requests.

The link potential values may then be calculated from the forecast connectivity requests. Links which are capable of supporting a high number of requests are considered more costly, and therefore have a higher link potential value.

The link potential values may then be used as a multiplier for the link cost calculations as shown above in relation to FIGS. 2 to 6. In other words, the link cost is instead calculated by multiplying the usage by the link potential value for each direct link before dividing by the link capacity.

The cost may then be calculated as:

$$\text{Cost}(d_{ij}, l_{ab}) = P_{ab} \cdot \frac{U_{ij} + U_{ab}}{C_{ab}}.$$

Step 903 of the method comprises determining an optimal route between nodes based on the plurality of link potential values, $P_{ab}$. Therefore the link potential values may be used to determine the optimum route for a communication request, $d_{ij}$.

In some embodiments, for a request, $d_{ij}$ to send traffic between a first node $n_i$ and a second node $n_j$ the method comprises determining a set of feasible routes, $F(d_{ij})$, between the first node, $n_i$, and the second node $n_j$; and determining, based on the plurality of link potential values, $P_{ab}$, which of the set of feasible routes, $F(d_{ij})$, is an optimal route for the request, $d_{ij}$. In other words, as described previously, only routes which are considered feasible, for example routes which have total latency below a threshold value, are considered when choosing an optimal route.

In some embodiments, the method comprises calculating a cost of each feasible route, $R_k(d_{ij})$, based on the link potential values, $P_{ab}$, link usage values, $U_{ab}$ (for example the bandwidth of traffic over the link), and link capacity values, $C_{ab}$ for each of the direct links, $l_{ab}$ in each respective feasible route. The method may then comprise selecting the feasible route with the lowest cost as the optimal route for the request, $d_{ij}$. In some embodiments, the link usage value comprises the required usage for the request $d_{ij}$ and/or any pre-existing usage already present on the link, $l_{ab}$, similarly to as described with reference to FIGS. 4 to 6.

The method may further comprise allocating requests to the network based on the cost of each feasible route. In other words, a request may be allocated to the feasible route having the lowest cost.

By including the link potential values in the determination of an optimal route, regardless of which definition of link potential value is used, the connectivity service allocation in telecommunication networks may be greatly improved, as will be demonstrated with reference to FIGS. 10 to 21 below.

While methods based on predictive analytics may in some circumstances yield even more reliable service allocation, they require massive amounts of data, large processing power and increased time to tune the data analysis. By performing cost calculations based on static data, such as node potential values or forecast connectivity requests, the embodiments described herein may have an advantage of only requiring calculations either once before the network operation, or once every time that static information changes (e.g., physical interfaces or service forecasts).

FIGS. 10 to 14 illustrate embodiments where the link potential value is calculated based on node potential values.

Figure 10:
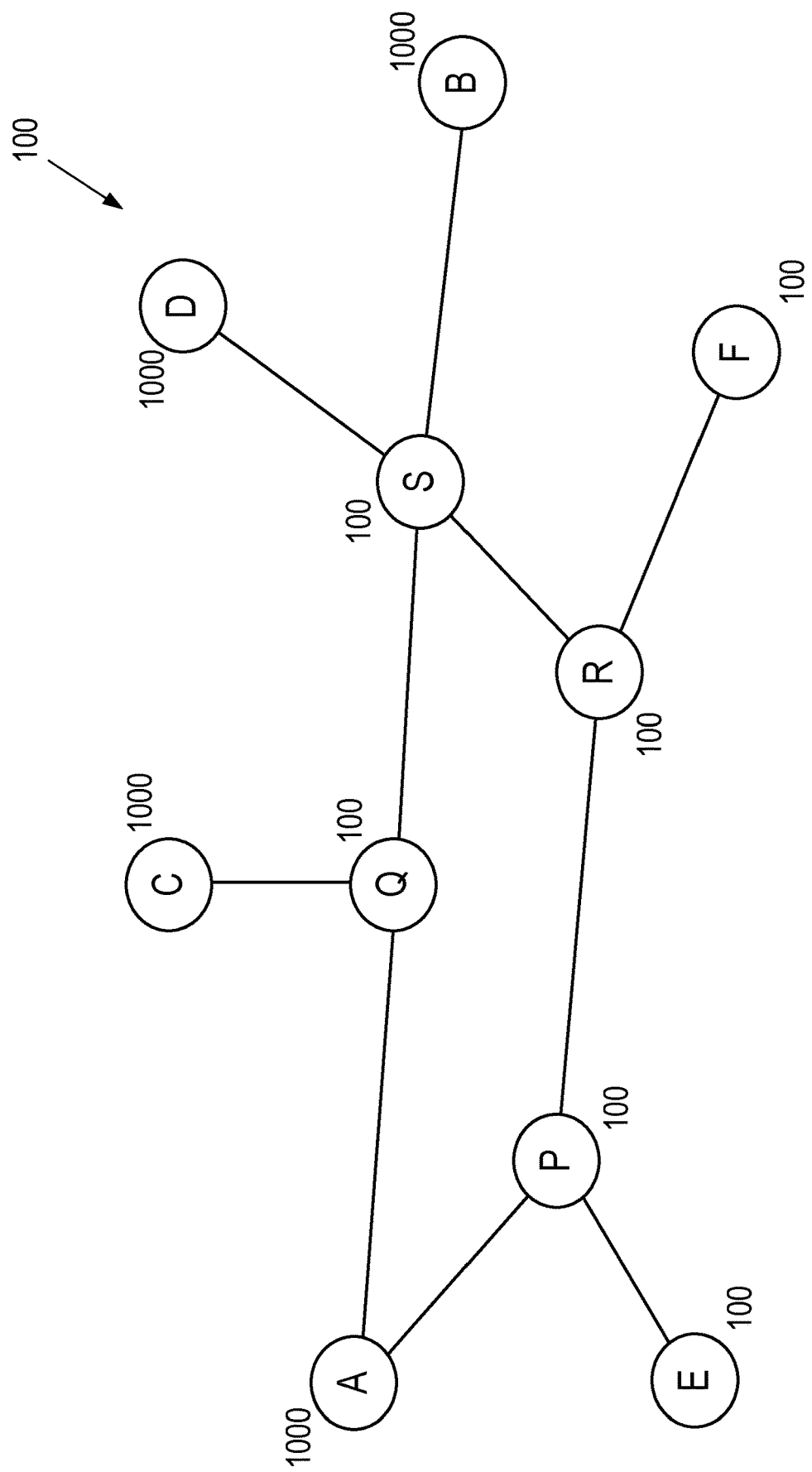
FIG. 10 illustrates an example of the respective node potential values of nodes in the network 100.

FIG. 10 illustrates the network 100 with the nodes labelled with respective node potential values. Again, the node and link labels have been omitted from this figure for clarity, but the labelling provided in FIG. 1 applies. In this example, the node potential values have been allocated arbitrarily, for ease of calculation. However, it will be appreciated that the node potential values may be determined based on a number of factors, for example the total capacity of the terminating client interfaces on node $n_i$.

Nodes with larger client capacity may be expected to have a higher potential for generating traffic. An alternative could be to use the capacity of the client devices to determine the node potential values, as it may happen that client devices are attached to standard capacity interfaces, while adapting their internal resources to the actual needs. A node potential value, $P(n)$ for a node, n is therefore representative of a traffic handling capacity of the node in the network. By way of an illustrative example, the node potential, $P(n_A)$ for the node $n_A$ is 1000.

Figure 11:
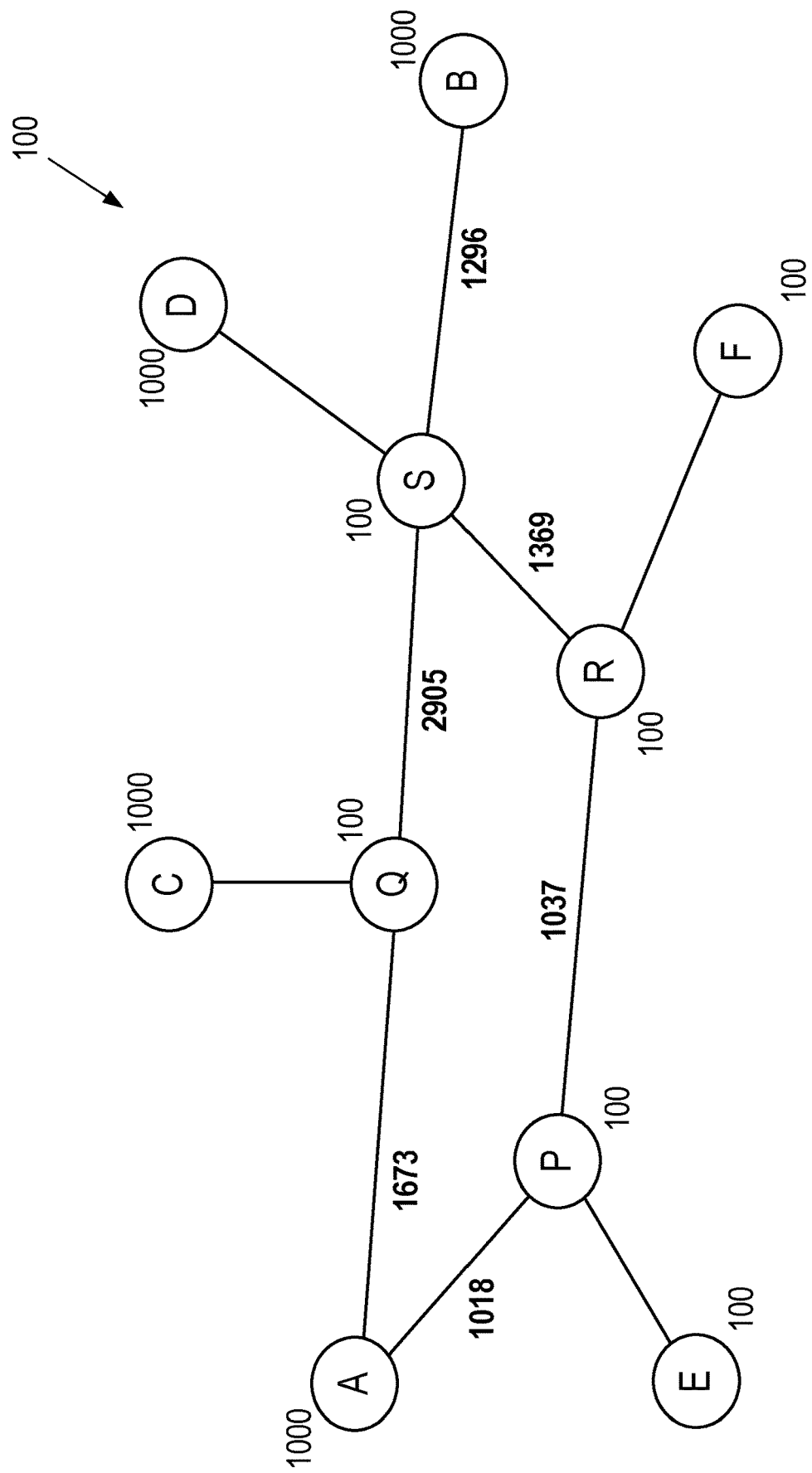
FIG. 11 illustrates an example of link potential values calculated based on the node potential values.

FIG. 11 illustrates an example of the link potential values, calculated based on the node potential values. Again, the node and link labels have been omitted from this figure for clarity, but the labelling provided in FIG. 1 applies.

Figure 12:
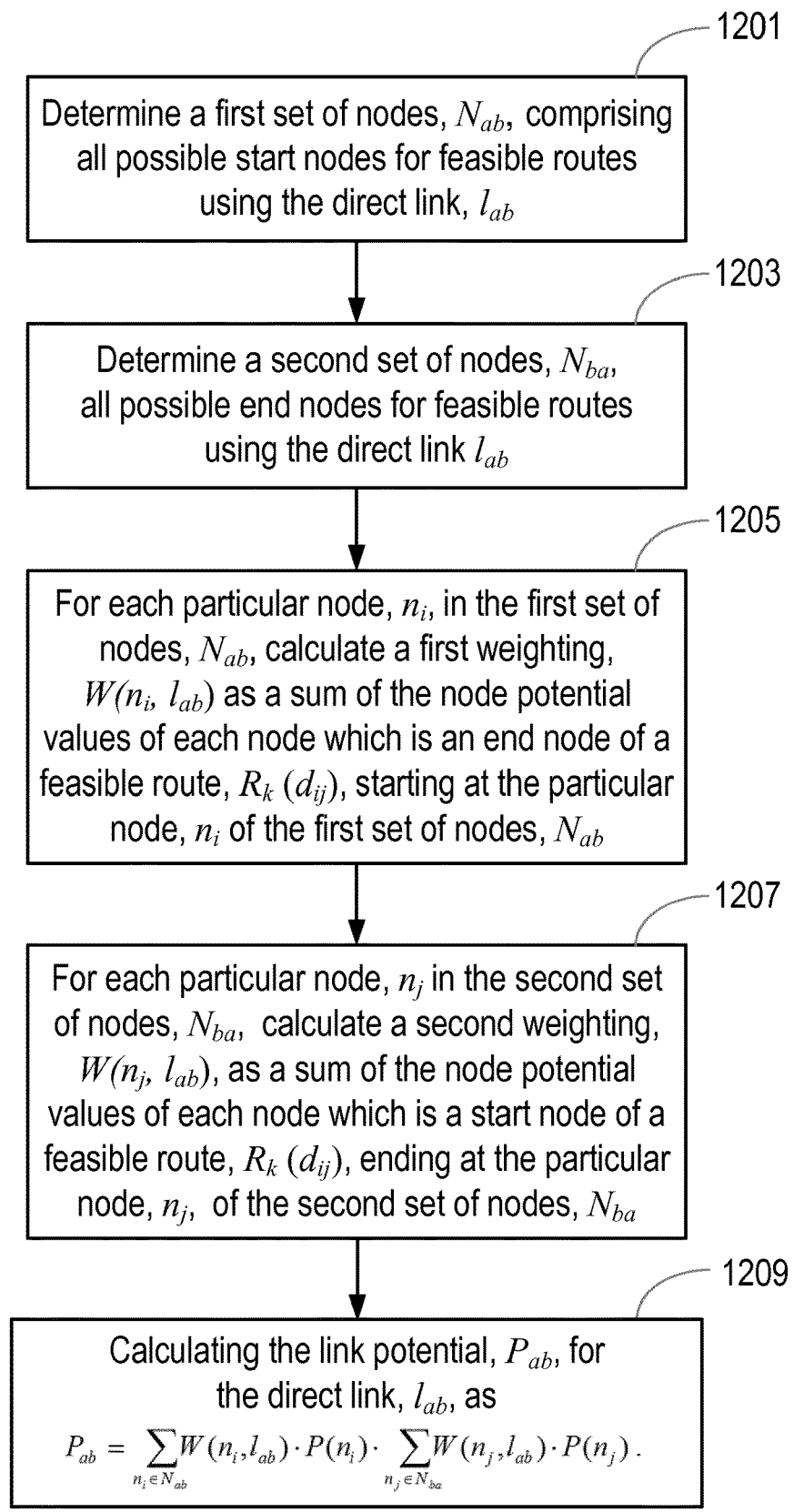
FIG. 12 illustrates an example of a method of calculating link potential values according to some embodiments.

The calculation of the link potential values may be performed, for example, as described by the method illustrated in FIG. 12. For example, the calculation of the link potential values may be performed by a node such as a PCE.

FIG. 12 illustrates a method of calculating link potential values according to some embodiments. The method as described may be performed by any network node. In some examples, this method may be performed by a PCE in the network.

Let D be the set of all the theoretical connectivity requests $d_{ij}$ between all the node pairs. For link $l_{ab}$ there may be a feasible route $R_k(d_{ij})$ containing link $l_{ab}$. It is worth noting here that the route and the related requests are oriented with respect to the link, which means that in the above notation, if $n_i$ and $n_j$ are the endpoints of the request $d_{ij}$ and $n_a$ and $n_b$ are the endpoints of the link $l_{ab}$, $n_i$ is on the $n_a$ side and $n_j$ is on the $n_b$ side, meaning that on $R_k(d_{ij})$, from $n_j$ the link $l_{ab}$ must be crossed to reach $n_a$, which is not true from $n_i$.

In step 1201 the method comprises determining a first set of nodes, $N_{ab}$, comprising all possible start nodes for feasible routes using the direct link, $l_{ab}$.

The first set of nodes $N_{ab}$ may be defined as:

$$N_{ab} = \{n_i | \exists j,k; l_{ab} \in R_k(d_{ij})\}.$$

Therefore, in the example network 100 (for example by referring to FIG. 11), for calculating, by way of example, the link potential value for the direct link $l_{AQ}$, the first set of nodes $N_{AQ}$ may comprise the nodes $n_A, n_E, n_F, n_P, n_R$, and $n_S$. The nodes $n_B$ and $n_D$ are not included in this first set of nodes $N_{AQ}$ as they do not comprise possible start nodes for feasible routes using the link $l_{AQ}$. This is because, to start from node $n_B$ or $n_D$ the penalty value of the route would be 5, i.e. because 5 links are crossed, using a nominal value of 1 for the penalty of each link in the network. As mentioned previously, the example choice of the maximum feasible route penalty is 4, and therefore the nodes $n_B$ and $n_D$ do not comprise start nodes for feasible routes through the link $l_{AQ}$ in this particular example.

In step 1203 the method comprises determining a second set of nodes, $N_{ba}$, comprising all possible end nodes for feasible routes using the direct link $l_{ab}$. The second set of nodes $N_{ba}$ may be defined as:

$$N_{ba} = \{n_j | \exists i,k; l_{ab} \in R_k(d_{ij})\}.$$

Therefore, in the example network 100 (for example by referring to FIG. 11), for calculating, by way of example, the link potential value for the direct link $l_{AQ}$, the second set of nodes $N_{QA}$ may comprise the nodes $n_B, n_C, n_D, n_F, n_P, n_Q, n_R$ and $n_S$. In a similar manner to the above, in this example $n_E$ is not considered a feasible end node, i.e. because, to start from node $n_E$, the penalty value of the route would be 5.

In step 1205, the method comprises for each particular node, $n_i$ in the first set of nodes, $N_{ab}$, calculating a first weighting, $W(n_i, l_{ab})$ as a sum of the node potential values of each node which is an end node of a feasible route, $R_k(d_{ij})$ starting at the particular node, $n_i$ of the first set of nodes, $N_{ab}$.

The first weighting $W(n_i, l_{ab})$ may therefore be calculated as:

$$W(n_i, l_{ab}) = \sum_{n_j \in N_{ba} \wedge \exists k | l_{ab} \in R_k(d_{ij})} P(n_j).$$

In step 1207, the method comprises for each particular node, $n_j$ in the second set of nodes, $N_{ba}$, calculating a second weighting, $W(n_j, l_{ab})$, as a sum of the node potential values of each node which is a start node of a feasible route, $R_k(d_{ij})$, ending at the particular node, $n_j$, of the second set of nodes, $N_{ba}$.

The second weighting $W(n_j, l_{ab})$ may therefore be calculated as:

$$W(n_j, l_{ab}) = \sum_{n_i \in N_{ab} \wedge \exists k | l_{ab} \in R_k(d_{ij})} P(n_i).$$

In step 1209, the method comprises calculating the link potential value, $P_{ab}$, for the direct link, $l_{ab}$, as:

$$P_{ab} = \sum_{n_i \in N_{ab}} W(n_i, l_{ab}) \cdot P(n_i) \cdot \sum_{n_j \in N_{ba}} W(n_j, l_{ab}) \cdot P(n_j).$$

Therefore, for the example shown in FIG. 11, the link potential value for the link $l_{AQ}$ was calculated as shown in the below tables. Firstly, the first weighting values are calculated as shown in Table 1. Implicit divisions by powers of 10 may be made to make the numbers more manageable. In this example the weighting values have been divided by a factor of 10,000.

TABLE 1

| $n_i \in N_{AQ}$ | $W(n_i, l_{AQ})$ | $P(n_i)$ | $W(n_i, l_{AQ}) \cdot P(n_i)$ |
|---|---|---|---|
| $n_A$ | 3500 | 1000 | 350 |
| $n_E$ | 1200 | 100 | 12 |
| $n_F$ | 100 | 100 | 1 |
| $n_P$ | 3300 | 100 | 33 |
| $n_R$ | 1200 | 100 | 12 |
| $n_S$ | 100 | 100 | 1 |
| $\sum_{n_i \in N_{ab}} W(n_i, l_{AQ}) \cdot P(n_i)$ | | | 409 |

The second weighting values are calculated as shown in Table 2. Again, implicit divisions by powers of 10 may be made to make the numbers more manageable. In this example the weighting values have been divided by a factor of 10,000.

TABLE 2

| $n_i \in N_{AQ}$ | $W(n_i, l_{AQ})$ | $P(n_i)$ | $W(n_i, l_{AQ}) \cdot P(n_i)$ |
|---|---|---|---|
| $n_B$ | 1100 | 1000 | 110 |
| $n_C$ | 1300 | 1000 | 130 |
| $n_D$ | 1100 | 1000 | 110 |
| $n_F$ | 1000 | 100 | 10 |
| $n_P$ | 1000 | 100 | 10 |
| $n_Q$ | 1500 | 100 | 15 |
| $n_R$ | 1100 | 100 | 11 |
| $n_S$ | 1300 | 100 | 13 |
| $\sum_{n_j \in N_{ba}} W(n_j, l_{AQ}) \cdot P(n_j)$ | | | 409 |

So therefore the link potential value for the link $l_{ab}$, again implicitly dividing by powers of 10 and rounding, gives:

$$P_{AQ} = \sum_{n_i \in N_{ab}} W(n_i, l_{ab}) \cdot P(n_i) \cdot \sum_{n_j \in N_{ba}} W(n_j, l_{ab}) \cdot P(n_j) = 1673$$

The remaining link potential values shown in FIG. 11 are calculated in a similar manner.

In other examples, a set of all feasible routes $F_{ab}(d_{ij})$ including the link $l_{ab}$ for all of the theoretical connectivity requests in the set D may be calculated as:

$$F_{ab} = \{R_k(d_{ij}) | l_{ab} \in R_k(d_{ij})\}.$$

The link potential for a link $l_{ab}$ may in this example be calculated as:

$$P_{ab} = \sum_{R_k(d_{ij}) \in F_{ab}} P(n_i) \cdot P(n_j).$$

In some embodiments, an exponential parameter may be included in the calculation of the link potential. This may trim the effect of the calculation of the link potential.

The link potential may alternatively be calculated as:

$$P_{ab} = \sum_{R_k(d_{ij}) \in F_{ab}} \min(P(n_i) \cdot P(n_j)).$$

Figure 13:
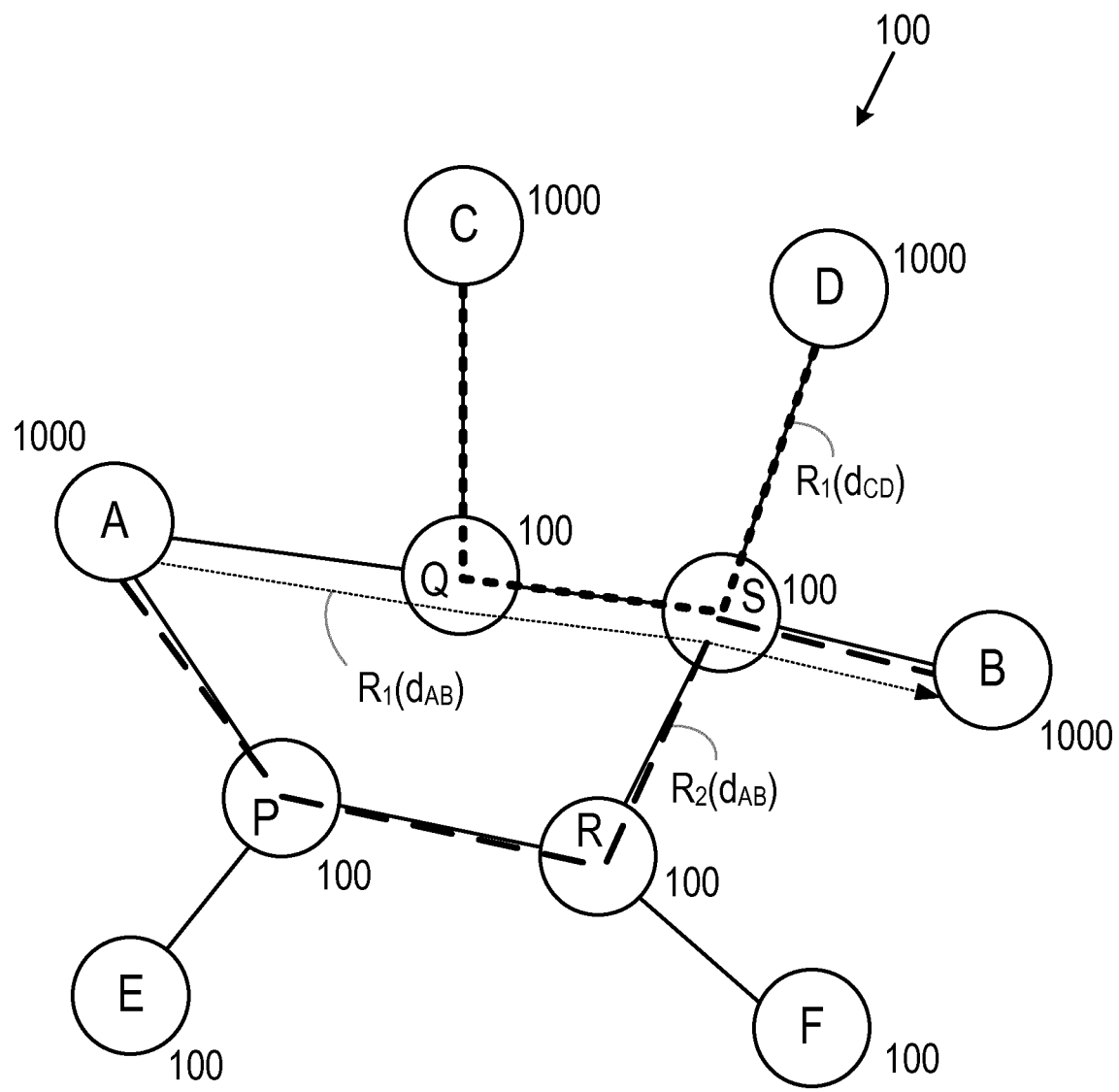
FIGS. 13 and 14 illustrate examples of the allocation of two actual requests in the network 100.
Figure 14:
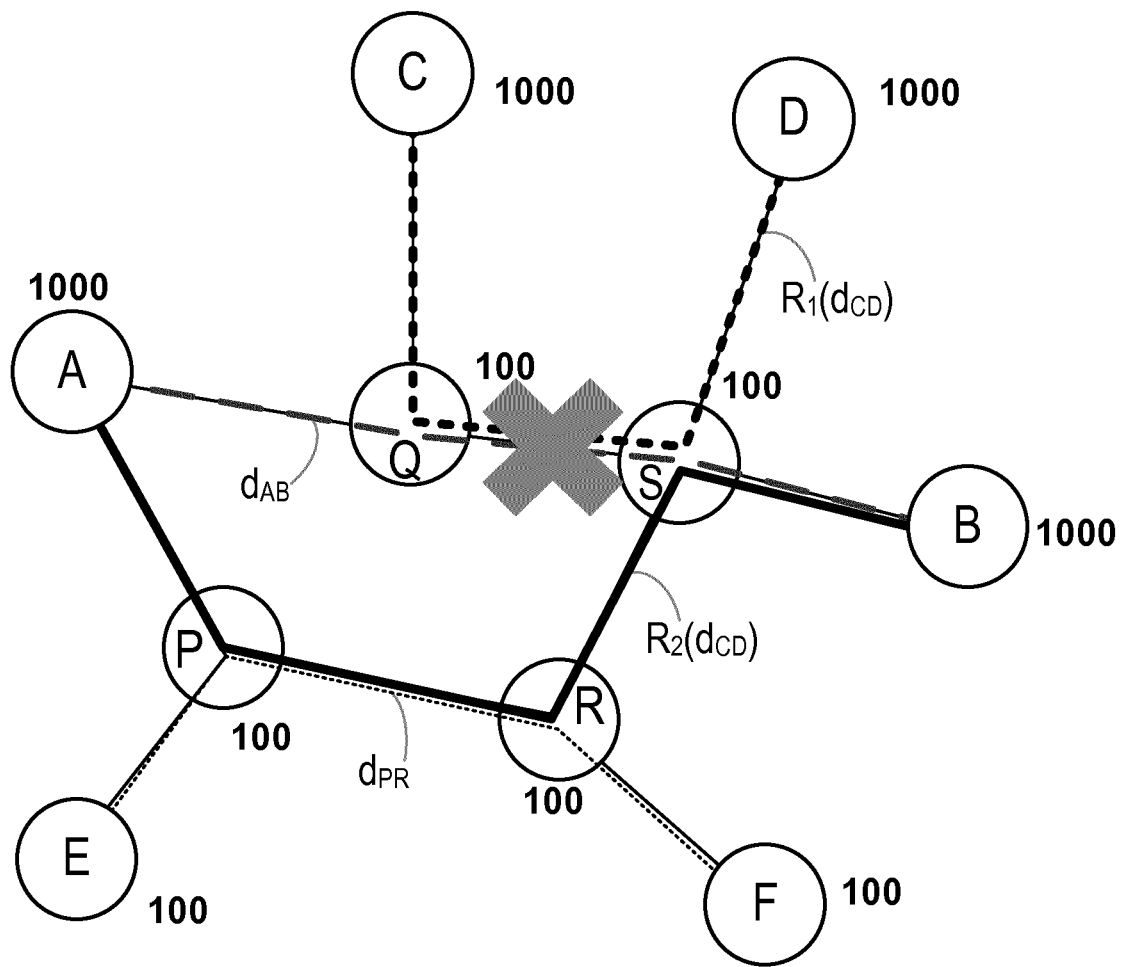

FIGS. 13 and 14 illustrate two actual requests for allocation to the network 100: $d_{AB}$ which is a request to communicate traffic between the nodes $n_A$ and $n_B$; and $d_{CD}$ which is a request to communicate traffic between the nodes $n_C$ and $n_D$.

The requests in FIGS. 13 and 14 have been allocated using the method as described with respect to FIGS. 10 to 12.

In this example, the request $d_{AB}$ has a usage value of $U_{AB}$=300 Mb/s, and the request $d_{CD}$ has a usage value of $U_{CD}$=800 Mb/s.

Referring to FIG. 11 for the link potential values, the $d_{AB}$ cost calculation for allocation to an empty network as shown in FIG. 13 may be as follows:

For the route, $R_1(d_{AB})$ through the nodes $n_A$, $n_Q$, $n_S$ and $n_B$ the cost may be calculated as (including making implicit divisions by multiples of 10):

$$\text{Cost}(R_1(d_{AB})) = \frac{P_{AQ} U_{AB}}{C_{AQ}} + \frac{P_{QS} U_{AB}}{C_{QS}} + \frac{P_{SB} U_{AB}}{C_{SB}} = (1673 + 2905 + 1296)\frac{300}{1000} = 1762.2$$

For the route, $R_2(d_{AB})$ through the nodes $n_A$, $n_P$, $n_R$, $n_S$ and $n_B$ the cost may be calculated as (including making implicit divisions by multiples of 10):

$$\text{Cost}(R_2(d_{AB})) = \frac{P_{AP} U_{AB}}{C_{AP}} + \frac{P_{PR} U_{AB}}{C_{PR}} + \frac{P_{RS} U_{AB}}{C_{RS}} + \frac{P_{SB} U_{AB}}{C_{SB}} =$$
$$(1018 + 1073 + 1369 + 1296)\frac{300}{1000} = 1426.8$$

$R_2(d_{AB})$ is therefore calculated as having a lower cost, and the communication request, $d_{AB}$ would be allocated to this route. This leaves the link capacity of the link $l_{QS}$ free for the allocation of the communication request $d_{CD}$, which has a high usage value. In this example, if the request $d_{AB}$ had been allocated to $R_1(d_{AB})$, the request $d_{CD}$ may have failed.

In the example of FIG. 14 there is pre-existing traffic, $d'_{AB}$ having a bandwidth of 300 Mb/s on the links $l_{AP}$ and $l_{PR}$, $l_{RS}$ and $l_{SB}$. There is also, in this example, pre-existing traffic $d_{PR}$ having a bandwidth of 100 Mb/s.

Therefore in this example with the pre-existing traffic $d'_{AB}$ and $d_{PR}$, for the route, $R_1(d_{AB})$ through the nodes $n_A$, $n_Q$, $n_S$ and $n_B$, the cost for the request $d_{AB}$ may be calculated as (including making implicit divisions by multiples of 10):

$$\text{Cost}(R_1(d_{AB})) = \frac{P_{AQ} U_{AB}}{C_{AQ}} + \frac{P_{QS} U_{AB}}{C_{QS}} + \frac{P_{SB}(U_{AB} + U_{SB})}{C_{SB}} =$$
$$(1673 + 2905)\frac{300}{1000} + 1296\frac{600}{1000} = 2151.$$

For the route, $R_2(d_{AB})$ through the nodes $n_A$, $n_P$, $n_R$, $n_S$ and $n_B$ the cost may be calculated as (including making implicit divisions by multiples of 10):

$$\text{Cost}(R_2(d_{AB})) = \frac{P_{AP}(U_{AB} + U_{AP})}{C_{AP}} +$$
$$\frac{P_{PR}(U_{AB} + U_{PR})}{C_{PR}} + \frac{P_{RS}(U_{AB} + U_{RS})}{C_{RS}} + \frac{P_{SB}(U_{AB} + U_{SB})}{C_{SB}} =$$
$$1018\frac{600}{1000} + 1073\frac{700}{1000} + 1369\frac{600}{1000} + 1296\frac{600}{1000} = 2960.9$$

As the pre-existing traffic is taken into account, the route, $R_1(d_{AB})$ will be used for the request $d_{AB}$. However, as the cost calculation does not take into account the magnitude of the request $d_{CD}$ to be allocated after $d_{AB}$, the request $d_{CD}$ will fail due to lack of remaining capacity on the link $l_{QS}$.

FIGS. 15 to 21 illustrate embodiments where the link potential values are calculated based on a set, D of forecast connectivity requests, $d_{ij}$.

Figure 15:
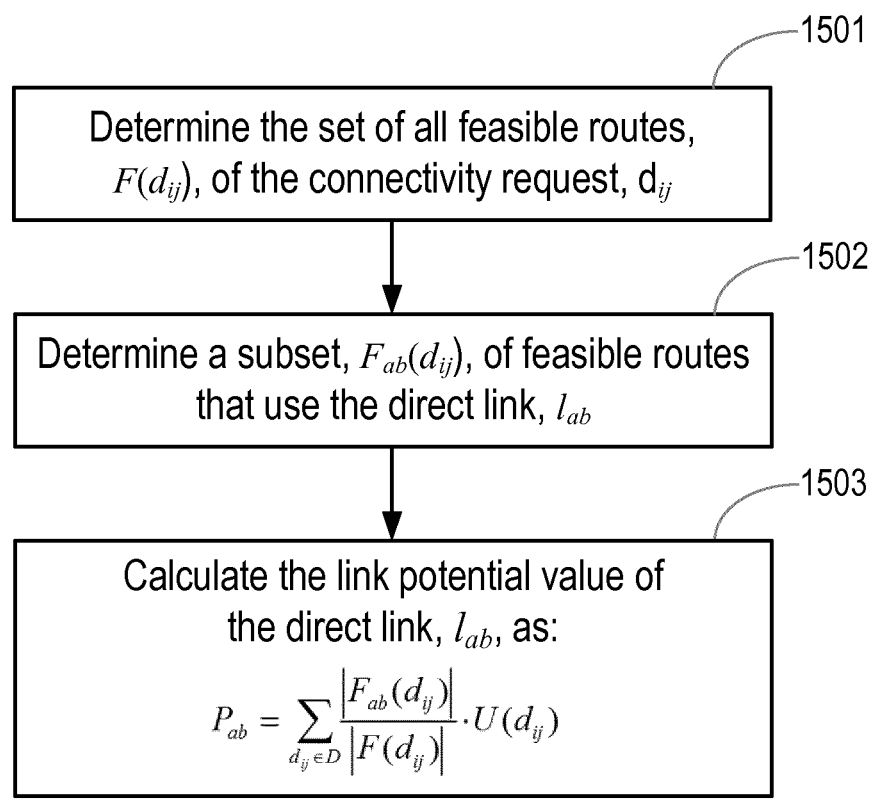
FIG. 15 illustrates an example of a method of calculating link potential values according to some embodiments.

FIG. 15 illustrates a method of calculating link potential values according to some embodiments. The method as described may be performed by any network node.

The set, D of forecast connectivity requests, $d_{ij}$ may in some example embodiments be determined from an estimate of the overlapping area between the areas serviced by two nodes and a population density of requesting devices in the overlapping area. For example, if the connectivity requests are for interfaces to be used for radio coordination between digital units connected to antennas providing overlapping cells, the expected interface utilization could be proportional to the cell overlapping area multiplied by the subscriber density in that area. The forecast connectivity requests may therefore be determined from this expected interface utilization.

In step 1501 the method comprises determining the set of all feasible routes, $F(d_{ij})$, of a connectivity request, $d_{ij}$.

The set of all feasible routes, $F(d_{ij})$ may for example be defined as:

$$F(d_{ij}) = \{R_k(d_{ij}) | \text{is\_feasible}(R_k(d_{ij}))\}.$$

Figure 16:
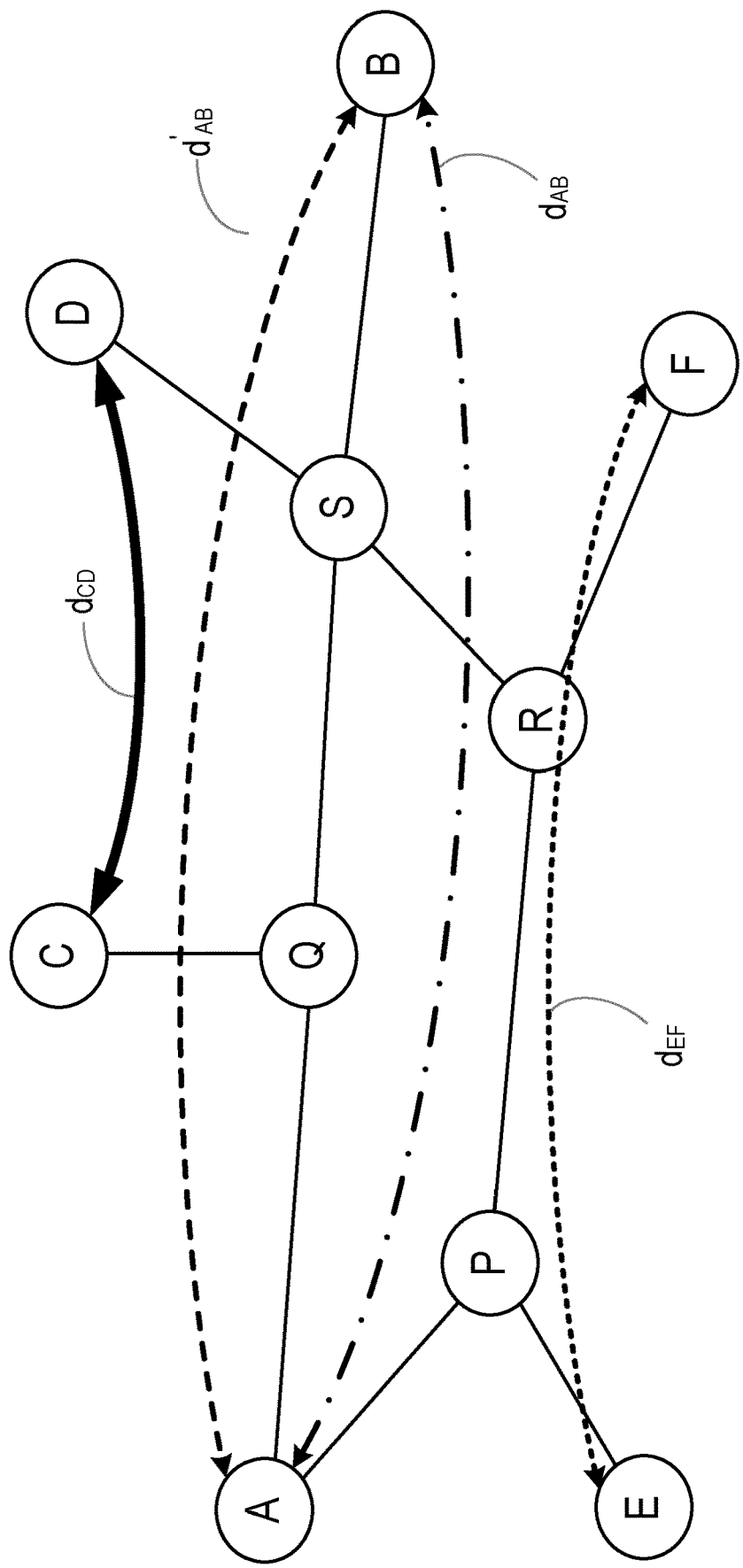
FIG. 16 illustrates an example of four forecast requests $d_{AB}$, $d'_{AB}$, $d_{CD}$ and $d_{EF}$ for the network 100.

FIG. 16 illustrates an example of the allocation of four forecast requests $d_{AB}$, $d'_{AB}$, $d_{CD}$ and $d_{EF}$. The usage values of these requests, in this example are: $U_{AB}$=300 Mb/s, $U'_{AB}$=300 Mb/s, $U_{CD}$=800 Mb/s and $U_{EF}$=100 Mb/s.

Figure 17:
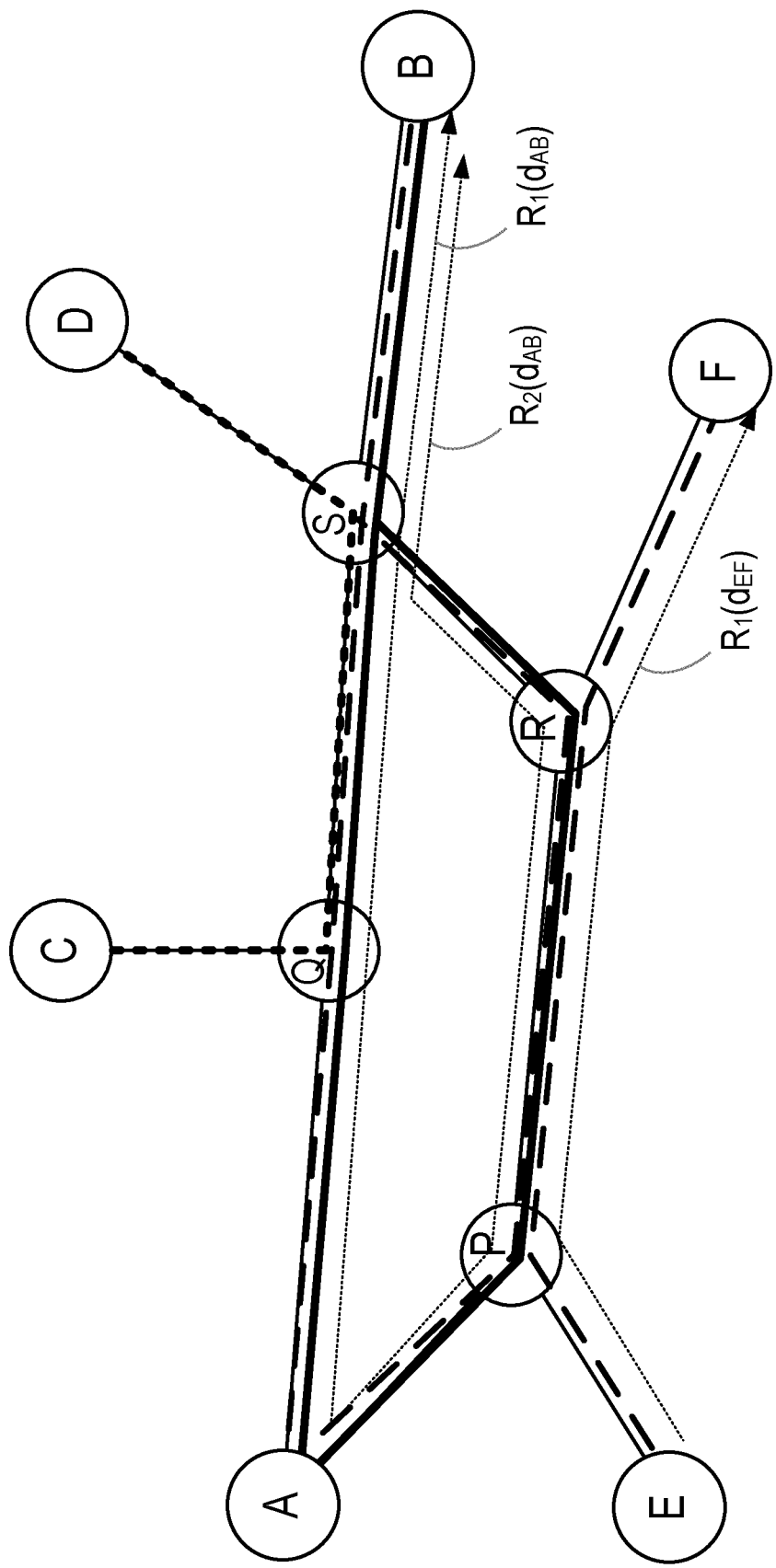
FIG. 17 illustrates feasible routes for requests $d_{AB}$, $d'_{AB}$, $d_{CD}$ and $d_{EF}$ in the network 100.

FIG. 17 illustrates the feasible routes for the requests $d_{AB}$, $d'_{AB}$, $d_{CD}$ and $d_{EF}$ in the network 100.

Given the above definition for the set of all feasible routes for a given request, it can be seen, that there are two feasible routes $R_1(d_{AB})$ and $R_2(d_{AB})$ for the requests $d_{AB}$ and $d'_{AB}$.

In this example, there is only one feasible route, $R_1(d_{CD})$ for the request $d_{CD}$, and similarly one feasible route, $R_1(d_{EF})$ for the request $d_{EF}$.

Returning to FIG. 15, in step 1503 the method comprises determining a subset, $F_{ab}(d_{ij})$, of feasible routes that use the direct link, $l_{ab}$.

In some embodiments, the subset $F_{ab}(d_{ij})$ may be calculated as:

$$F_{ab}(d_{ij}) = \{R_k(d_{ij}) | \text{is\_feasible}(R_k(d_{ij})) \wedge l_{ab} \in R_k(d_{ij})\}.$$

Therefore, for the example of FIG. 17, the subset of feasible routes, $F_{PR}(d_{AB})$ for the link $l_{PR}$, for the requests $d_{AB}$ and $d'_{AB}$ comprises only $R_1(d_{AB})$ as $R_2(d_{AB})$ does not cross the link $l_{PR}$. The subset of feasible routes, $F_{PR}(d_{CD})$ for the link $l_{PR}$ is empty, as the route $R_1(d_{CD})$ does not cross the link $l_{PR}$. The subset of feasible routes, $F_{PR}(d_{EF})$ for the link $l_{PR}$, comprises the route $R_1(d_{EF})$ as this route does cross the link $l_{PR}$.

Returning to FIG. 15, step 1505 comprises calculating the link potential value of the direct link, $l_{ab}$, as:

$$P_{ab} = \sum_{d_{ij} \in D} \frac{|F_{ab}(d_{ij})|}{|F(d_{ij})|} \cdot U_{ij};$$

where $U_{ij}$ is a usage requirement of the forecast connectivity request, $d_{ij}$. The vertical bars in the calculation of the link potential value here denote cardinality.

Therefore, for the example in FIG. 17, the link potential value for the link $l_{PR}$ may be calculated as:

$$P_{PR} = \sum_{d_{ij} \in D} \frac{|F_{PR}(d_{ij})|}{|F(d_{ij})|} \cdot U_{ij} = \frac{1}{1}100 + \frac{1}{2}300 + \frac{1}{2}300 = 400.$$

Figure 18:
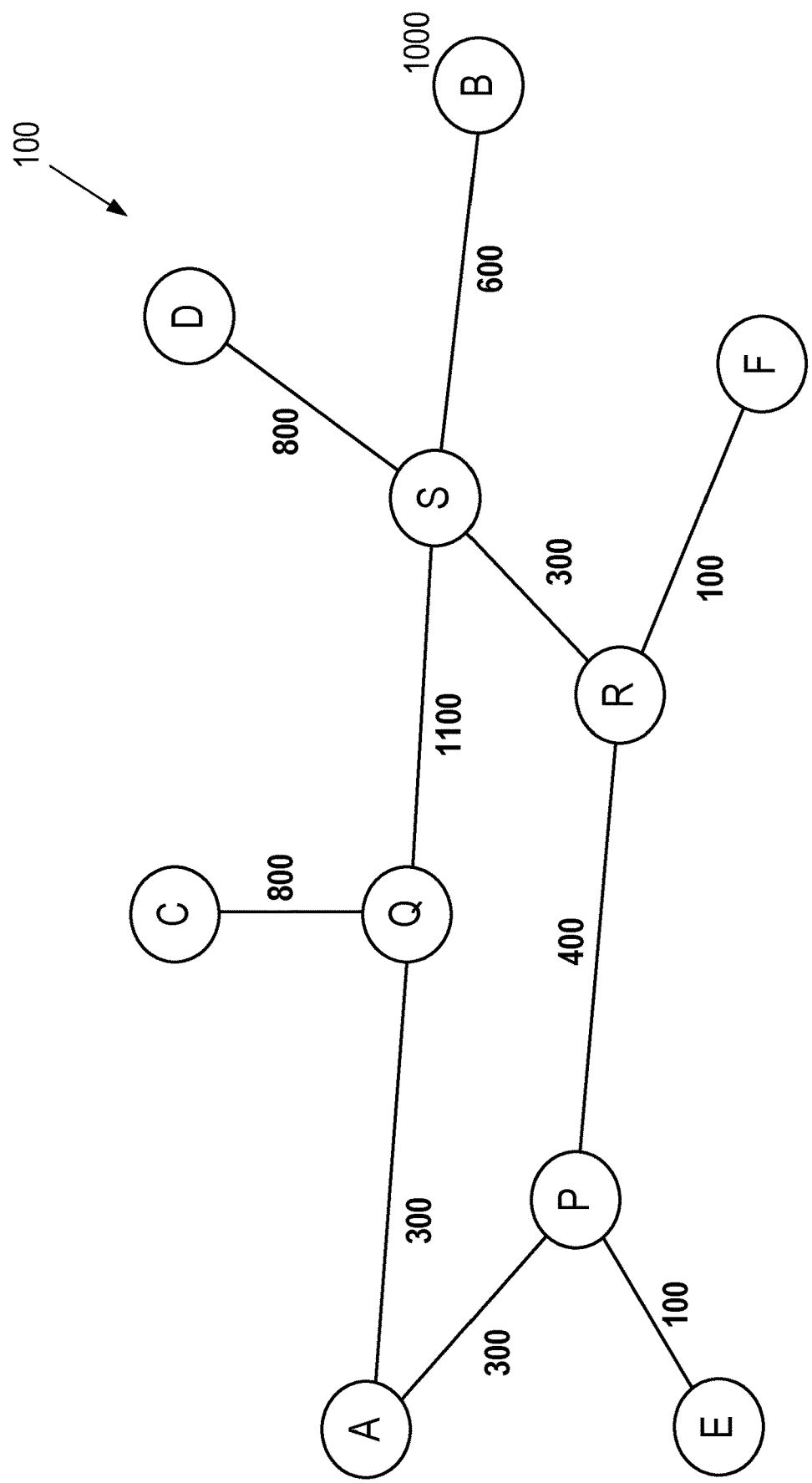
FIG. 18 illustrates an example of the link potential values for the network 100.

FIG. 18 illustrates an example of the link potential values for the network 100. In this example, the link potential values are calculated as described in relation to FIGS. 15 to 17.

As requests are allocated routes for communication, they may be removed from the forecast connectivity requests and the link potential values may be recomputed. In other words, the link potential value, $P_{ab}$ for each direct link, $l_{ab}$ may be recalculated as each forecast connectivity request is allocated an optimal route for use.

Figure 19:
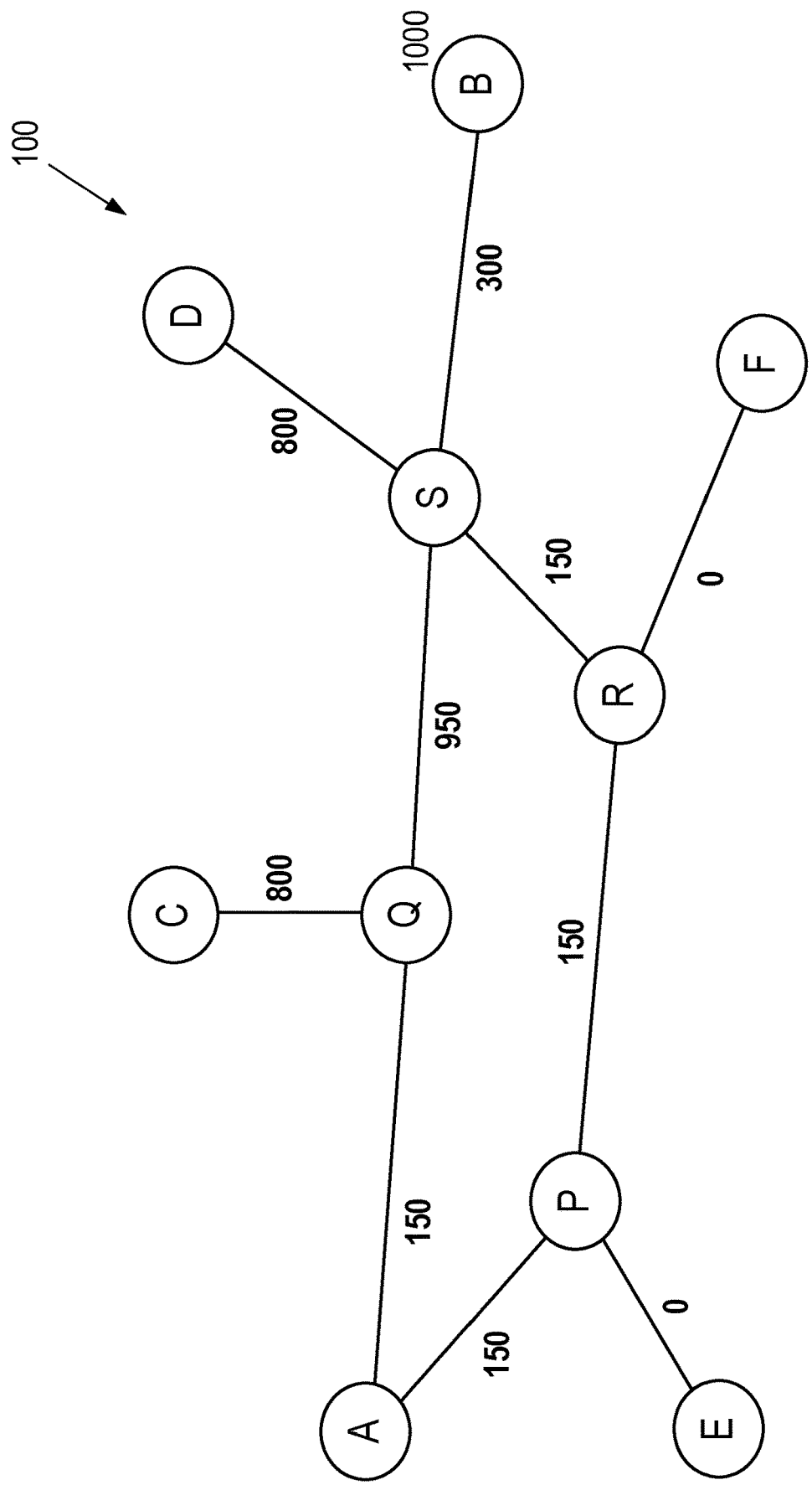
FIG. 19 illustrates the link potential values of the network 100 after requests $d'_{AB}$ and $d_{EF}$ have been allocated.

FIG. 19 illustrates an example of recalculated link potential values of the network 100 after the requests $d'_{AB}$ and $d_{EF}$ have been allocated.

Figure 20:
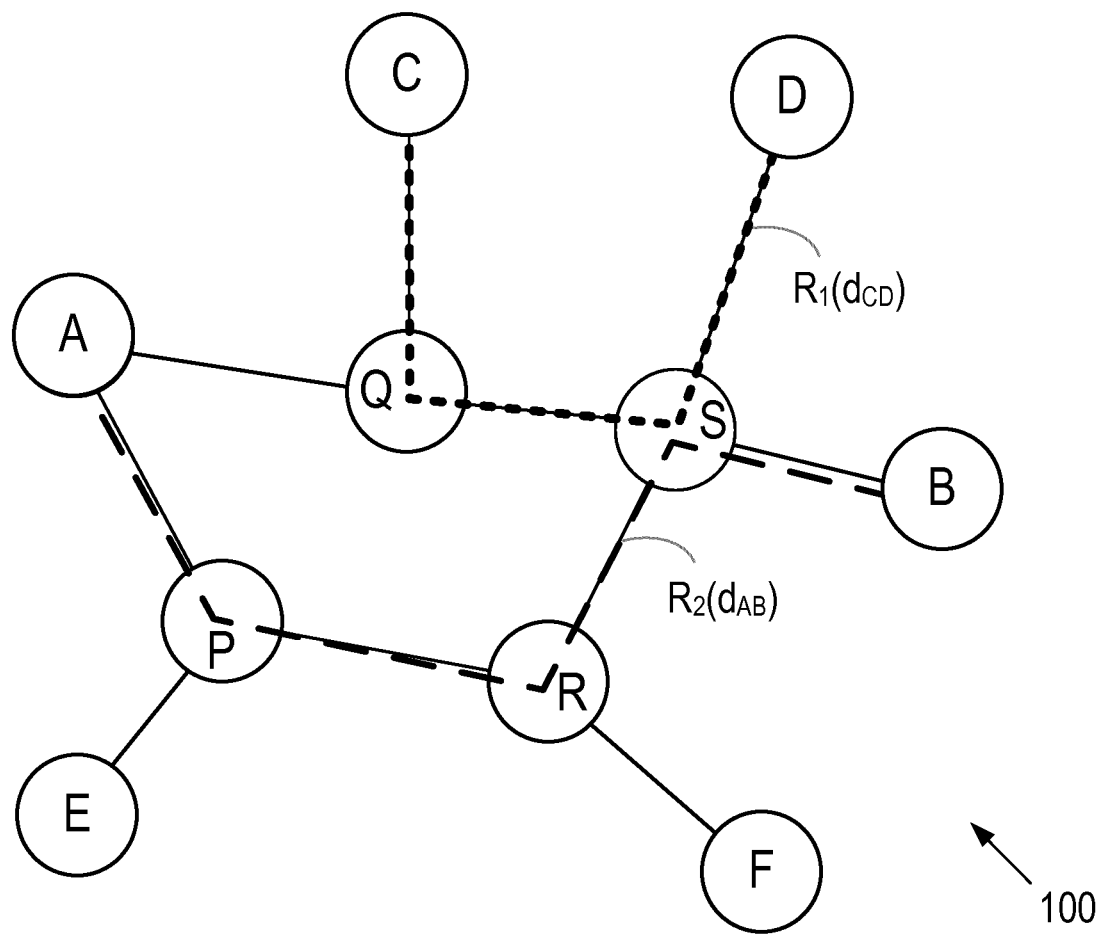
FIGS. 20 and 21 illustrate the allocation of four forecasted requests $d_{AB}$, $d'_{AB}$, $d_{CD}$ and $d_{EF}$ in the network 100.
Figure 21:
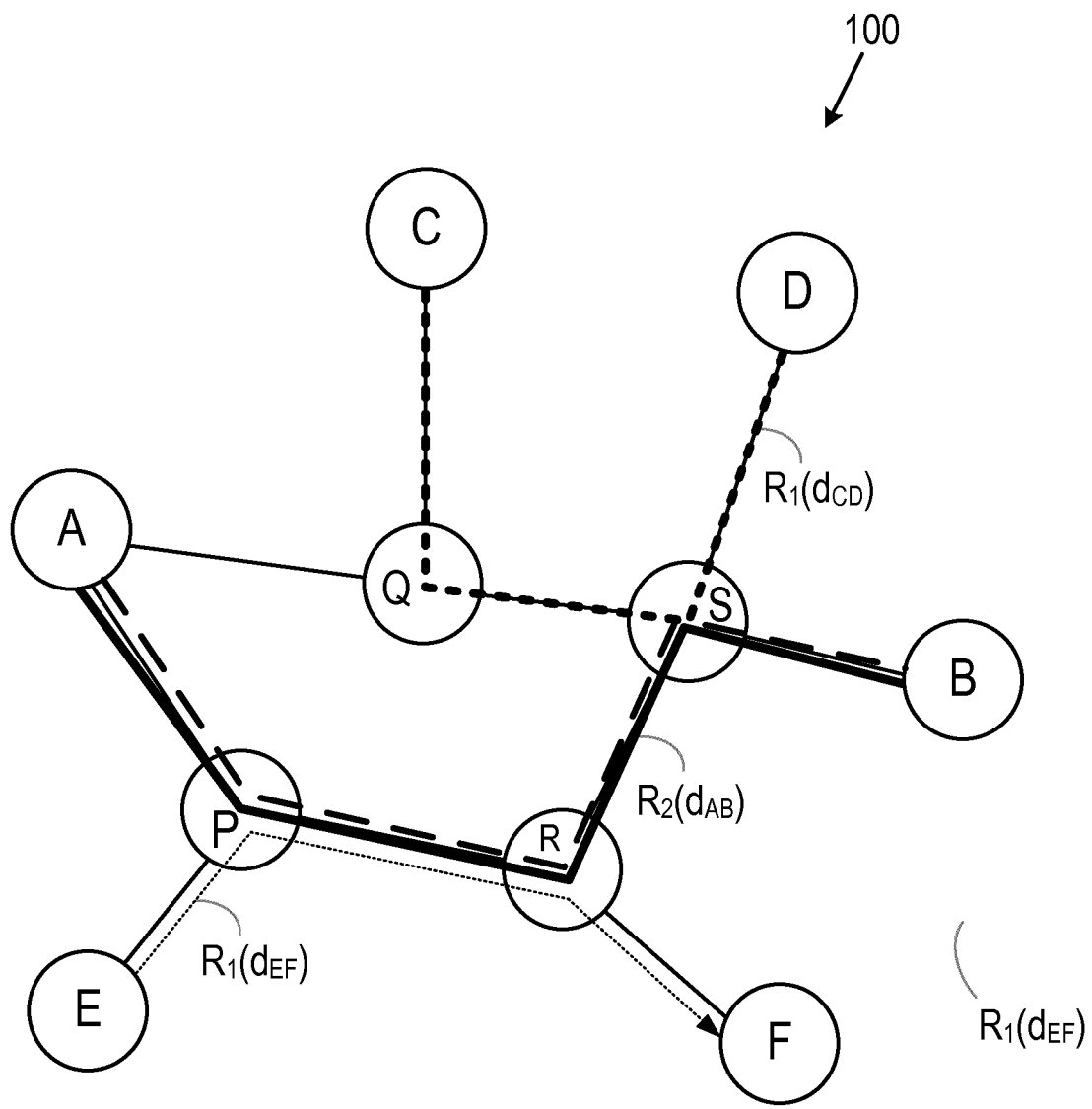

FIGS. 20 and 21 illustrate the allocation of four forecasted requests $d_{AB}$, $d'_{AB}$, $d_{CD}$ and $d_{EF}$ in the network 100.

The requests in FIGS. 20 and 21 have been allocated using the method as described with respect to FIGS. 15 to 19.

In this example, the usage values of these requests are, $U_{AB}$=300 Mb/s, $U'_{AB}$=300 Mb/s, $U_{CD}$=800 Mb/s and $U_{EF}$=100 Mb/s.

FIG. 20 illustrates the allocation of the requests $d_{AB}$ and $d_{CD}$ in an empty network 100.

The link potential values for the empty network are as calculated and shown in FIG. 18. Therefore referring to FIG. 18, the cost calculation for the optimal route for the request $d_{AB}$ may be as follows:

For the route, $R_1(d_{AB})$ through the nodes $n_A$, $n_Q$, $n_S$ and $n_B$ the cost may be calculated as (including making implicit divisions by multiples of 10):

$$\text{Cost}(R_1(d_{AB})) =$$
$$\frac{P_{AQ}U_{AB}}{C_{AQ}} + \frac{P_{QS}U_{AB}}{C_{QS}} + \frac{P_{SB}U_{AB}}{C_{SB}} = (300 + 1100 + 600)\frac{300}{1000} = 600$$

For the route, $R_2(d_{AB})$ through the nodes $n_A$, $n_P$, $n_R$, $n_S$ and $n_B$, the cost may be calculated as (including making implicit divisions by multiples of 10):

$$\text{Cost}(R_2(d_{AB})) = \frac{P_{AP}U_{AB}}{C_{AP}} + \frac{P_{PR}U_{AB}}{C_{PR}} + \frac{P_{RS}U_{AB}}{C_{RS}} + \frac{P_{SB}U_{AB}}{C_{SB}} =$$
$$(300 + 400 + 300 + 600)\frac{300}{1000} = 480$$

Therefore, as shown in FIG. 20, the request $d_{AB}$ will be allocated to the route $R_2(d_{AB})$ as this has a lower calculated cost value. The communication request $d_{CD}$ may then be allocated to the route $R_1(d_{CD})$ as there is enough available capacity remaining on the link $l_{QS}$. The allocation may be performed by a network node such as a PCE by controlling or updating a software defined network centralized controller.

FIG. 21 illustrates the allocation of requests $d_{AB}$ and $d_{CD}$ into the network 100, when the requests $d'_{AB}$ and $d_{EF}$ have already been allocated.

As the requests $d'_{AB}$ and $d_{EF}$ have already been allocated to the network. The relevant link potential values are those shown in FIG. 19.

Therefore referring to FIG. 19, the cost calculation for the optimal route for the request $d_{AB}$ may be as follows:

For the route, $R_1(d_{AB})$ through the nodes $n_A$, $n_Q$, $n_S$ and $n_B$ the cost may be calculated as (making implicit divisions by multiples of 10):

$$\text{Cost}(R_1(d_{AB})) = \frac{P_{AQ}U_{AB}}{C_{AQ}} + \frac{P_{QS}U_{AB}}{C_{QS}} + \frac{P_{SB}U_{AB}}{C_{SB}} = (150 + 950 + 300)\frac{300}{1000} = 510$$

For the route, $R_2(d_{AB})$ through the nodes $n_A$, $n_P$, $n_R$, $n_S$ and $n_B$ the cost may be calculated as (making implicit divisions by multiples of 10):

$$\text{Cost}(R_2(d_{AB})) = \frac{P_{AP}U_{AB}}{C_{AP}} + \frac{P_{PR}U_{AB}}{C_{PR}} + \frac{P_{RS}U_{AB}}{C_{RS}} + \frac{P_{SB}U_{AB}}{C_{SB}} =$$

$$(150 + 150 + 150 + 300)\frac{300}{1000} = 465$$

Therefore, as shown in FIG. 21, the request $d_{AB}$ will be allocated to the route $R_2(d_{AB})$ as this has a lower calculated cost value. This is in contrast to the method as described in relation to FIG. 14, whereas the later request $d_{CD}$ was not taken into account the route $d_{AB}$ was allocated a route which would cause the later request to fail. Whereas in this example, the route $d_{CD}$ may be allocated to the route $R_1(d_{CD})$ with enough available capacity on the link $l_{QS}$.

Figure 22:
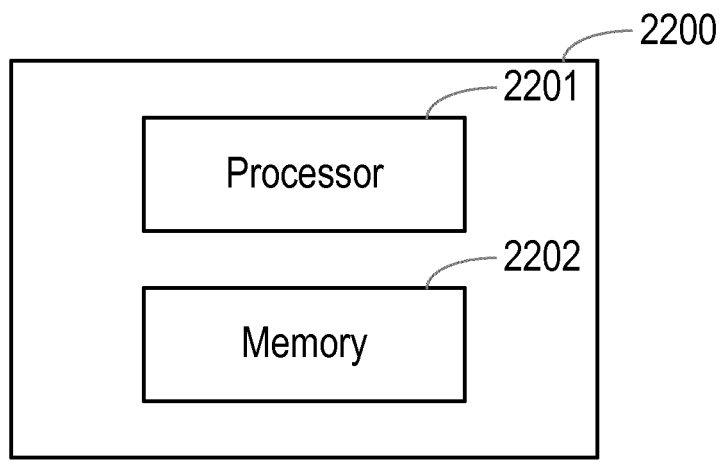
FIG. 22 illustrates a network node for determining an optimal route between nodes in a communications network.

FIG. 22 illustrates a network node for determining an optimal route between nodes in a communications network. The network node 2200 may for example be a PCE. The network node 2200 comprises a processor 2201 and a memory 2202, said memory 2202 containing instructions executable by said processor 2201, wherein said processor 2201 is operative to assign a plurality of link potential values, $P_{ab}$, to a respective plurality of direct links, $l_{ab}$, between respective first and second nodes a and b in the network, wherein a link potential value, $P_{ab}$, represents a likelihood that the corresponding direct link will be used for future communication requests; and determine an optimal route between nodes based on the plurality of link potential values, $P_{ab}$.

Figure 23:
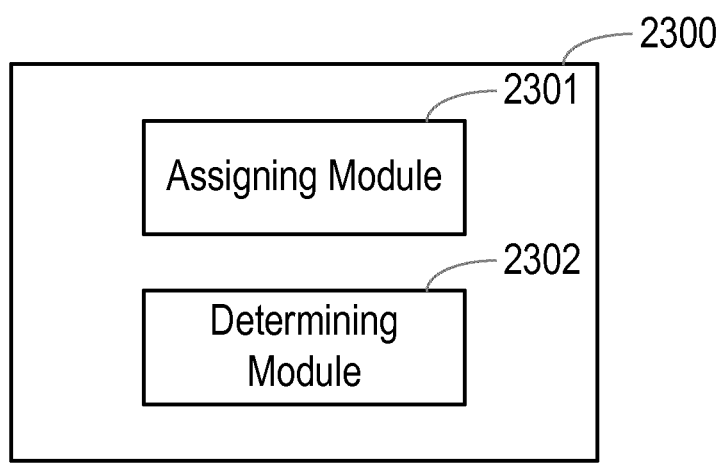
FIG. 23 illustrates a network node for determining an optimal route between nodes in a communications network.

FIG. 23 illustrates a network node 2300 for determining an optimal route between nodes in a communications network. The network node 2300 comprises an assigning module 2301 for assigning a plurality of link potential values, $P_{ab}$, to a respective plurality of direct links, $l_{ab}$, between respective first and second nodes a and b in the network, wherein a link potential value, $P_{ab}$, represents a likelihood that the corresponding direct link will be used for future communication requests; and a determining module 2302 for determining an optimal route between nodes based on the plurality of link potential values, $P_{ab}$.

Figure 24:
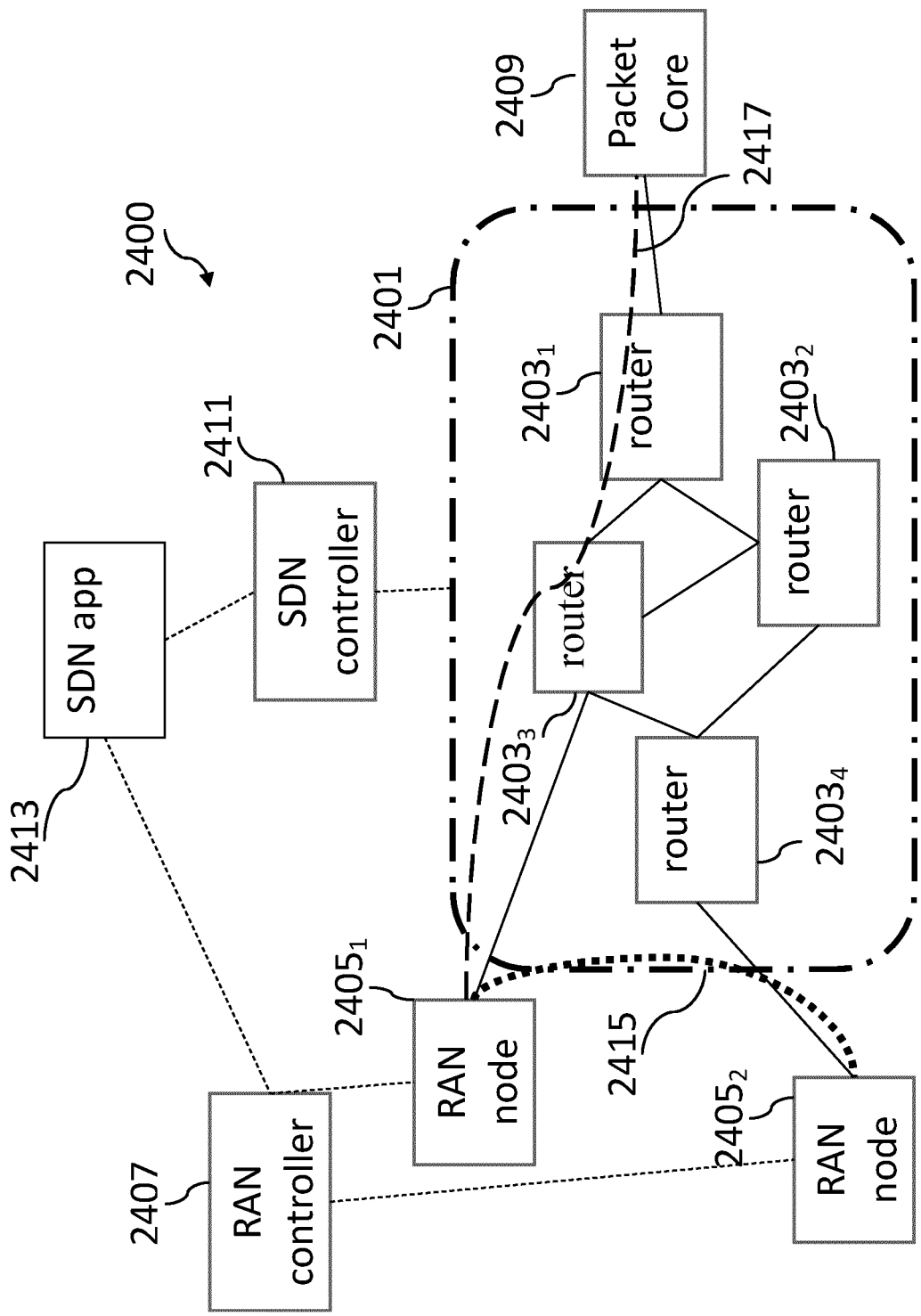
FIG. 24 illustrates an example radio network 2400.

FIG. 24 illustrates an example radio network according to some embodiments. The radio network 2400 comprises a transport network 2401 comprising a plurality of routers $2403_1$ to $2403_4$. Radio access network nodes $2405_1$ and $2405_2$ provide accesses to the transport network 2401 and are controller by an optional RAN controller 2407. The RAN controller 2407 functions may be placed within the RAN nodes $2405_1$ and $2405_2$. The RAN nodes $2405_1$, $2405_2$ may be digital units, antennas or other combinations, depending on the particular deployment. The radio network 2400 also comprises a packet core 2409.

The transport network 2401 is controlled by a software defined network (SDN) controller 2411.

A SDN applications node 2413 may be a network node 2200 or 2300 as previously described. In other words, the SDN applications node 2413 may be configured to carry out the method as described above.

The SDN applications node may receive transport network topology information together with link capacity and penalty values from the SDN controller 2411. The SDN applications node may receive RAN topology, node potential values and/or forecast connectivity requests from the RAN controller 2407.

An example of generally fronthaul communication is represented by the line 2415, e.g. between two Digital Units, and an example of backhaul communication is represented by the line 2417.

Figure 25:
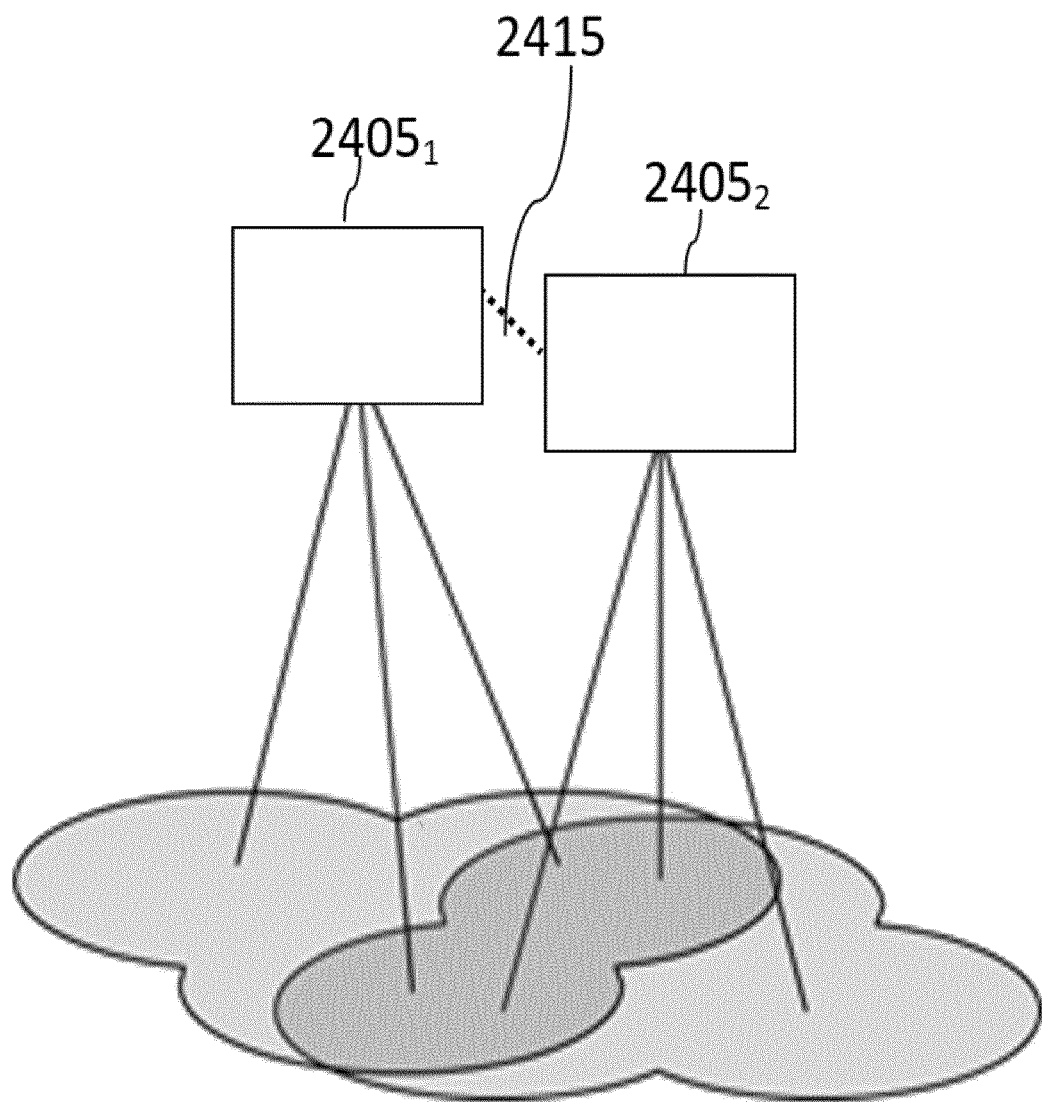
FIG. 25 illustrates an example of an overlapping potential service area.

In some embodiments, for example for elastic RAN, elastic RAN interfaces shall be setup among the RAN nodes, which for this example are implemented as Digital Units (DUs). In this example, the forecast connectivity requests between two DUs may be calculated by determining the two potential service areas covered by the antennas subtended by each DU respectively, and determining the intersection of these two areas (overlapping), as shown in FIG. 25. The size of the intersection of the two cell areas may then be multiplied by a density of subscribers within the overlapping area. The result of this multiplication may be proportional to the probability of requiring connectivity capacity between the two DUs, thereby providing a demand forecast with a usage value. The above example of calculating forecast connectivity request is performed by using static network information, e.g. the antenna coverage and subscriber information.

It will be appreciated that in some example embodiments the methods described herein are performed by cloud based entities. The method may be performed by a cloud-based server where the cloud is a distributed network and may be a public cloud (such as the Internet), private cloud, hybrid cloud, or the like.

There is therefore provided a method and apparatus for determining an optimal route between nodes in a communications network. In particular, the present embodiments improve on the robustness of such determination by utilising link potential values representing a likelihood that the corresponding direct link will be used in future communication requests. These link potential values may be calculated based on static characteristics of the network, thereby reducing the amount of required computing power during allocation of communication requests.

It should be noted that the above-mentioned embodiments illustrate rather than limit the invention, and that those skilled in the art will be able to design many alternative embodiments without departing from the scope of the appended claims. The word "comprising" does not exclude

The invention claimed is:

1. A method of determining an optimal route for communication between nodes in a communications network, the method comprising:
assigning a plurality of link potential values, $P_{ab}$, to a respective plurality of direct links, $l_{ab}$, between respective first and second nodes a and b in the communications network, wherein each link potential value represents a likelihood that the corresponding direct link will be used for future communication requests; and
determining an optimal route between nodes based on the plurality of link potential values;
wherein the plurality of link potential values are based on a plurality of node potential values P(n) for nodes in the network;
wherein a node potential value for a node is representative of a traffic handling capacity of that node in the communications network;
wherein the assigning the plurality of link potential values comprises, for each direct link:
determining a first set of nodes $N_{ab}$ comprising all possible start nodes for feasible routes using the direct link;
determining a second set of nodes $N_{ba}$ comprising all possible end nodes for feasible routes using the direct link; and
for each particular node $n_i$ in the first set of nodes, calculating a first weighting $W(n_i, l_{ab})$ as a sum of the node potential values of each node which is an end node of a feasible route $R_k(d_{ij})$ starting at that particular node $n_i$ of the first set of nodes;
for each particular node $n_j$ in the second set of nodes, calculating a second weighting $W(n_j, l_{ab})$ as a sum of the node potential values of each node which is a start node of a feasible route $R_k(d_{ij})$ ending at that particular node $n_j$ of the second set of nodes; and
calculating the link potential, $P_{ab}$, for the direct link as:

$$P_{ab} = \sum_{n_i \in N_{ab}} W(n_i, l_{ab}) \cdot P(n_i) \cdot \sum_{n_j \in N_{ba}} W(n_j, l_{ab}) \cdot P(n_j).$$

2. The method of claim 1, further comprising, for a request, $d_{ij}$ to send traffic between a first node $n_i$ and a second node $n_j$:
determining a set of feasible routes $F(d_{ij})$ between the first node and the second node; and
determining, based on the plurality of link potential values, which of the set of feasible routes is an optimal route for the request.

3. The method of claim 2, wherein the determining which of the set of feasible routes is an optimal route for the request comprises:
calculating a cost of each feasible route $R_k(d_{ij})$ based on the link potential values, link usage values $U_{ab}$, and link capacity values $C_{ab}$ for each of the direct links in each respective feasible route; and
selecting the feasible route with the lowest cost as the optimal route for the request.

4. The method of claim 3, wherein the link usage value $U_{ab}$ includes usage for the direct link $l_{ab}$ in the request and/or any pre-existing usage on that direct link.

5. The method of claim 1, wherein the plurality of link potential values are calculated based on a set D of forecast connectivity requests.

6. The method of claim 5, wherein the set of forecast connectivity requests is determined from an estimate of an overlapping area between areas serviced by two nodes and a population density of requesting wireless devices in the overlapping area.

7. A method of determining an optimal route for communication between nodes in a communications network, the method comprising:
assigning a plurality of link potential values, $P_{ab}$, to a respective plurality of direct links, $l_{ab}$, between respective first and second nodes a and b in the communications network, wherein each link potential value represents a likelihood that the corresponding direct link will be used for future communication requests; and
determining an optimal route between nodes based on the plurality of link potential values;
wherein the plurality of link potential values are calculated based on a set D of forecast connectivity requests;
wherein the assigning the plurality of link potential values comprises, for each forecast connectivity request:
determining the set of all feasible routes $F(d_{ij})$ of the connectivity request;
determining a subset $F_{ab}(d_{ij})$ of feasible routes that use the direct link; and
calculating the link potential value of the direct link as:

$$P_{ab} = \sum_{d_{ij} \in D} \frac{|F_{ab}(d_{ij})|}{|F(d_{ij})|} \cdot U_{ij};$$

where $U_{ij}$ is a usage requirement of the forecast connectivity request.

8. The method of claim 7, wherein the link potential value for each direct link is recalculated as each forecast connectivity request is allocated an optimal route for use.

9. The method claim 2, wherein a route is a feasible route if the route comprises less than or equal to a predetermined number of direct links or if the total delay across the direct links of the route is less than a predetermined delay.

10. A network node configured to determine an optimal route between nodes in a communications network, the network node comprising:
processing circuitry;
memory containing instructions executable by the processing circuitry whereby the network node is operative to:
assign a plurality of link potential values $P_{ab}$ to a respective plurality of direct links $l_{ab}$ between respective first and second nodes a and b in the communications network, wherein a link potential value represents a likelihood that the corresponding direct link will be used for future communication requests; and
determine an optimal route between nodes based on the plurality of link potential values;
wherein the plurality of link potential values are based on a plurality of node potential values P(n) for nodes in the network;

wherein a node potential value for a node is representative of a traffic handling capacity of that node in the communications network;
wherein the instructions are such that the network node is operative to assign the plurality of link potential values by, for each direct link:
determining a first set of nodes $N_{ab}$ comprising all possible start nodes for feasible routes using that direct link;
determining a second set of nodes $N_{ba}$ comprising all possible end nodes for feasible routes using that direct link;
for each particular node $n_i$ in the first set of nodes, calculating a first weighting, $W(n_i, l_{ab})$ as a sum of the node potential values of each node which is an end node of a feasible route $R_k(d_{ij})$ starting at that particular node $n_i$ of the first set of nodes;
for each particular node $n_j$ in the second set of nodes, calculating a second weighting $W(n_j, l_{ab})$ as a sum of the node potential values of each node which is a start node of a feasible route $R_k(d_{ij})$ ending at that particular node $n_j$ of the second set of nodes; and
calculating the link potential $P_{ab}$ for the direct link as:

$$P_{ab} = \sum_{n_i \in N_{ab}} W(n_i, l_{ab}) \cdot P(n_i) \cdot \sum_{n_j \in N_{ba}} W(n_j, l_{ab}) \cdot P(n_j).$$

11. The network node of claim 10, wherein the instructions are such that the network node is operative to, for a request $d_{ij}$ to send traffic between a first node $n_i$ and a second node $n_j$:
determine a set of feasible routes $F(d_{ij})$, between the first node and the second node; and
determine, based on the plurality of link potential values, which of the set of feasible routes is an optimal route for the request.

12. The network node of claim 11, wherein the instructions are such that the network node is operative to determine, based on the plurality of link potential values, which of the set of feasible routes is the optimal route for the request by:
calculating a cost of each feasible route $R_k(d_{ij})$ based on the link potential values, link usage values $U_{ab}$, and link capacity values $C_{ab}$ for each of the direct links in each respective feasible route; and
selecting the feasible route with the lowest cost as the optimal route for the request.

13. The network node of claim 12, wherein the link usage values include usage for the direct link in the request and/or any pre-existing usage on that link.

14. The network node of claim 10, wherein the plurality of link potential values are based on a set of forecast connectivity requests.

15. A network node configured to determine an optimal route between nodes in a communications network, the network node comprising:
processing circuitry;
memory containing instructions executable by the processing circuitry whereby the network node is operative to:
assign a plurality of link potential values $P_{ab}$ to a respective plurality of direct links $l_{ab}$ between respective first and second nodes a and b in the communications network, wherein a link potential value represents a likelihood that the corresponding direct link will be used for future communication requests; and
determine an optimal route between nodes based on the plurality of link potential values;
wherein the plurality of link potential values are based on a set of forecast connectivity requests;
wherein the instructions are such that the network node is operative to assign the plurality of link potential values by, for each forecast connectivity request $d_{ij}$:
determining the set of all feasible routes $F(d_{ij})$ of the connectivity request;
determining a subset $F_{ab}(d_{ij})$ of feasible routes that use the direct link $l_{ab}$; and
calculating the link potential value of the direct link $l_{ab}$, as:

$$P_{ab} = \sum_{d_{ij} \in D} \frac{|F_{ab}(d_{ij})|}{|F(d_{ij})|} \cdot U(d_{ij});$$

where $U(d_{ij})$ is a usage requirement of that forecast connectivity request.

16. The network node of claim 11, wherein a route is a feasible route if the route comprises less than or equal to a predetermined number of direct links or if the total delay across the direct links of the route is less than a predetermined delay.

* * * * *